(12) United States Patent
Li et al.

(10) Patent No.: US 11,134,001 B2
(45) Date of Patent: Sep. 28, 2021

(54) DATA DISTRIBUTION METHOD AND DISTRIBUTION SERVER

(71) Applicant: Huawei Technologies Co., Ltd., Shenzhen (CN)

(72) Inventors: Congjuan Li, Nanjing (CN); Jin Li, Nanjing (CN); Feng Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 16/820,270

(22) Filed: Mar. 16, 2020

(65) Prior Publication Data

US 2020/0220800 A1   Jul. 9, 2020

Related U.S. Application Data

(63) Continuation of application No. PCT/CN2018/112595, filed on Oct. 30, 2018.

(30) Foreign Application Priority Data

Nov. 24, 2017   (CN) .......................... 201711189288.1

(51) Int. Cl.
| | | |
|---|---|---|
| *G06F 15/16* | (2006.01) | |
| *H04L 12/751* | (2013.01) | |
| *H04L 1/18* | (2006.01) | |
| *H04L 12/721* | (2013.01) | |

(52) U.S. Cl.
CPC ............ *H04L 45/02* (2013.01); *H04L 1/1812* (2013.01); *H04L 45/44* (2013.01)

(58) Field of Classification Search
USPC .......................................... 709/200; 370/255
See application file for complete search history.

(56) References Cited

U.S. PATENT DOCUMENTS

| | | | |
|---|---|---|---|
| 7,110,404 B1 * | 9/2006 | Temoshenko | ....... H04L 12/2801 370/389 |
| 7,512,084 B2 | 3/2009 | Jalonen | |
| 8,782,285 B1 | 7/2014 | Cassidy et al. | |

(Continued)

FOREIGN PATENT DOCUMENTS

| | | |
|---|---|---|
| CN | 101039262 A | 9/2007 |
| CN | 101132269 A | 2/2008 |

(Continued)

*Primary Examiner* — Anthony Mejia
(74) *Attorney, Agent, or Firm* — Slater Matsil, LLP

(57) ABSTRACT

A method includes: continuously receiving a first upstream data packet and a second upstream data packet that are sent by an upstream node; copying the first upstream data packet, converting, based on an established connection mapping table, a first packet in two packets obtained through copying, sending a first downstream data packet obtained through conversion to a downstream node or a user terminal, and performing control management on a second packet obtained by copying the first upstream data packet; and copying the second upstream data packet, converting, based on the connection mapping table, a first packet in two packets obtained through copying, sending a second downstream data packet obtained through conversion to the downstream node or the user terminal, and performing control management on a second packet obtained by copying the second upstream data packet.

20 Claims, 23 Drawing Sheets

(56) References Cited

U.S. PATENT DOCUMENTS

| | | | |
|---|---|---|---|
| 2011/0199941 A1* | 8/2011 | Ouellette | H04L 12/1836 370/256 |
| 2013/0117413 A1 | 5/2013 | Kaneko et al. | |
| 2013/0322869 A1* | 12/2013 | Hirth | H04B 10/071 398/16 |
| 2015/0280998 A1* | 10/2015 | Kitani | H04L 41/0896 370/254 |
| 2015/0372908 A1 | 12/2015 | Kashyap et al. | |
| 2016/0150055 A1 | 5/2016 | Choi | |

FOREIGN PATENT DOCUMENTS

| | | |
|---|---|---|
| CN | 101291295 A | 10/2008 |
| CN | 103119958 A | 5/2013 |
| CN | 103997500 A | 8/2014 |
| JP | 2009055418 A | 3/2009 |
| JP | 2015012570 A | 1/2015 |
| WO | 2012132283 A1 | 10/2012 |
| WO | 2015048999 A1 | 4/2015 |

\* cited by examiner

DATA DISTRIBUTION METHOD AND DISTRIBUTION SERVER

CROSS-REFERENCE TO RELATED APPLICATIONS

This application is a continuation of International Application No. PCT/CN2018/112595, filed on Oct. 30, 2018, which claims priority to Chinese Patent Application No. 201711189288.1, filed on Nov. 24, 2017. The disclosures of the aforementioned applications are hereby incorporated by reference in their entireties.

TECHNICAL FIELD

This disclosure relates to the field of network technologies, and in particular, to a data distribution method and a distribution server.

BACKGROUND

A distribution server is usually used in a content delivery network (CDN). The content delivery network is an overlay network constructed by using a plurality of levels of CDN nodes (for example, a CDN intermediate node and a CDN edge node in FIG. 1) based on a conventional telecommunication network. Based on a scale of the content delivery network, each level of CDN node includes one or more distribution servers, and each distribution server may provide a distribution service of data such as a video, a picture, or a file for a user terminal based on the hypertext transfer protocol (HTTP) or the real-time media protocol (RTMP). In the content delivery network, the distribution server can provide two distribution services, namely, a hit service and a transit service, based on whether the distribution server stores data requested by the user terminal. The hit service occurs when the distribution server stores the data requested by the user terminal, and the transit service occurs when the distribution server does not store the data requested by the user terminal and further needs to transit a content request to another distribution server or a source station.

FIG. 2 is a schematic diagram of an internal architecture of a distribution server providing a transit service. The distribution server mainly includes two parts: a protocol stack and an application layer. As shown in FIG. 2, the protocol stack is responsible for protocol processing related to the internet protocol (TCP/IP), and includes two modules: a server/a client. The server is responsible for processing a TCP connection (which is referred to as a downstream connection for short below) to a user terminal, including: establishment of the downstream connection, distribution of a data packet, reliability control management (for example, rate control), and forwarding of the data packet to a server of the application layer. The client is responsible for processing a TCP connection (which is referred to as an upstream connection for short below) to an upstream node, including: establishment of the upstream connection, receiving of a data packet, reliability control management (for example, whether data packets are out of order), and forwarding of the data packet to a client of the application layer.

In addition, the application layer also includes two modules: a server/a client. The server of the application layer is responsible for receiving a content request of the user terminal, triggering the client of the application layer to request (get) data from the upstream node, receiving a data packet that is sent by the upstream node and that is forwarded by the client of the application layer, and forwarding the data packet to the server of the protocol stack, so as to send the received data packet to a downstream node or the user terminal. The client of the application layer is triggered by the server of the application layer to initiate the content request to the upstream node, and the content request triggers the client of the protocol stack to establish a connection to the upstream node. Then, the client of the application layer receives a data packet obtained by the client of the protocol stack from the upstream node, and forwards the data packet to the server of the application layer.

For brevity, in a normal data packet processing procedure, a data packet needs to undergo control management of the protocol stack (for example, detecting whether the data packets are out of order), is transmitted to the application layer and then forwarded by the application layer to the protocol stack, undergoes control management of the protocol stack (for example, the rate control), and finally is sent by the protocol stack to the user terminal, so as to implement data distribution.

In a process of implementing this disclosure, the inventor finds that the related technology has at least the following problem: In a data packet distribution process, a data distribution process and a control management process are severely mixed, in other words, a data packet can be distributed only after control management is performed on the data packet. Consequently, the control management process delays distribution of the data packet, and a relatively great delay is caused.

SUMMARY

Embodiments of this disclosure provide a data distribution method and a distribution server, so as to resolve a problem in a related technology that a data distribution delay is relatively great. The technical solutions are as follows.

According to a first aspect, a data distribution method is provided, where the method is applied to a distribution server, and the method includes: continuously receiving a first upstream data packet and a second upstream data packet that are sent by an upstream node; copying the first upstream data packet, converting, based on an established connection mapping table, a first packet in two packets obtained through copying, sending a first downstream data packet obtained through conversion to a downstream node or a user terminal, and performing control management on a second packet obtained by copying the first upstream data packet; and copying the second upstream data packet, converting, based on the connection mapping table, a first packet in two packets obtained through copying, sending a second downstream data packet obtained through conversion to the downstream node or the user terminal, and performing control management on a second packet obtained by copying the second upstream data packet.

The connection mapping table provides a mapping relationship between upstream connection information and downstream connection information. Specifically, the connection mapping table includes a plurality of mapping entries, each mapping entry provides N-tuple information of an upstream connection, N-tuple information of a downstream connection that matches the N-tuple information of the upstream connection, and a difference between initial sequence numbers of the upstream connection and the downstream connection.

In addition, the distribution server includes at least an application layer, a protocol stack, and a data forwarding layer. The data forwarding layer is responsible for the foregoing data distribution procedure, and the protocol stack is responsible for the foregoing control management procedure, so as to separate data forwarding and control management. Specifically, the protocol stack includes a first enabling interface, and the application layer invokes the first enabling interface of the protocol stack before sending a content request of the user terminal to the upstream node. The first enabling interface carries an upstream/downstream connection identifier and an enabling flag for instructing to separate the data forwarding function and the control management function. After being invoked by the application layer, the protocol stack separates the data forwarding function and the control management function of the upstream/downstream connection.

In addition, the data forwarding layer includes a second enabling interface, and after being invoked by the application layer, the protocol stack invokes the second enabling interface of the data forwarding layer. The second enabling interface carries the upstream connection information and the downstream connection information, and after being invoked by the protocol stack, the data forwarding layer establishes the connection mapping table.

In a first possible implementation of the first aspect, a sequence number of the first upstream data packet and a sequence number of the second upstream data packet are nonconsecutive, and the first upstream data packet is received before the second upstream data packet.

In other words, an upstream packet loss occurs, and consequently a data packet is lost, and the distribution server does not receive the data packet.

With reference to the first aspect, in a second possible implementation of the first aspect, the converting a first packet in two packets obtained through copying includes: obtaining N-tuple information in the first packet; querying the connection mapping table based on the N-tuple information in the first packet, to obtain a target mapping entry matching the N-tuple information in the first packet; and replacing the N-tuple information in the first packet with N-tuple information of a target downstream connection included in the target mapping entry, and calculating a sequence number of the target downstream connection based on a difference between target initial sequence numbers included in the target mapping entry and a sequence number carried in the first packet.

With reference to the first aspect or the first possible implementation of the first aspect, in a third possible implementation of the first aspect, the performing control management on a second packet obtained by copying the first upstream data packet includes: performing an out-of-order check on the second packet obtained by copying the first upstream data packet, and sending an ACK (Acknowledgement) packet for the first upstream data packet to the upstream node.

With reference to the third possible implementation of the first aspect, in a fourth possible implementation of the first aspect, the method further includes: converting the second packet obtained by copying the first upstream data packet into a third downstream data packet; storing the third downstream data packet in a buffer, and setting a timeout timer; and when the timeout timer expires, sending the third downstream data packet to the downstream node or the user terminal.

With reference to the fourth possible implementation of the first aspect, in a fifth possible implementation of the first aspect, one piece of upstream connection information corresponds to one piece of downstream connection information in the connection mapping table, and the method further includes: when the ACK packet returned by the downstream node or the user terminal is received before the timeout timer expires, deleting the third downstream data packet stored in the buffer.

When the upstream node retransmits the lost data packet, the distribution server further performs the steps of forwarding the retransmitted data packet and performing control management on the retransmitted data packet.

With reference to the first aspect or the first possible implementation of the first aspect, in a sixth possible implementation of the first aspect, the method further includes: receiving a third upstream data packet retransmitted by the upstream node, where a sequence number of the third upstream data packet and the sequence number of the first upstream data packet are consecutive; and copying the third upstream data packet, converting, based on the connection mapping table, a first packet in two packets obtained through copying, sending a fourth downstream data packet obtained through conversion to the downstream node or the user terminal, and performing control management on a second packet obtained by copying the third upstream data packet.

A process of performing control management on the second packet obtained by copying the third upstream data packet is similar to the process of performing control management on the second packet obtained by copying the first upstream data packet. To be specific, an out-of-order check is performed on the second packet obtained by copying the third upstream data packet, and an ACK packet is sent to the upstream node; the second packet obtained by copying the third upstream data packet is converted into a downstream data packet, and the obtained downstream data packet is stored in a buffer, and a timeout timer is set; when the timeout timer expires, the stored downstream data packet is sent to the downstream node or the user terminal; and when the ACK packet returned by the downstream node or the user terminal is received before the timeout timer expires, the downstream data packet stored in the buffer is deleted.

With reference to the first aspect or the first possible implementation of the first aspect, in a seventh possible implementation of the first aspect, the performing control management on a second packet obtained by copying the second upstream data packet includes: performing an out-of-order check on the second packet obtained by copying the second upstream data packet, and sending an ACK packet for the first upstream data packet to the upstream node.

With reference to the seventh possible implementation of the first aspect, in an eighth possible implementation of the first aspect, the method further includes: after a fourth downstream data packet is sent to the downstream node or the user terminal, converting the second packet obtained by copying the second upstream data packet into a fifth downstream data packet; storing the fifth downstream data packet in a buffer, and setting a timeout timer; and when the timeout timer expires, sending the fifth downstream data packet to the downstream node or the user terminal.

With reference to the eighth possible implementation of the first aspect, in a ninth possible implementation of the first aspect, one piece of upstream connection information corresponds to one piece of downstream connection information in the connection mapping table, and the method further includes: when the ACK packet returned by the downstream node or the user terminal is received before the timeout timer expires, deleting the fifth downstream data packet stored in the buffer.

For a case in which a downstream packet loss is caused by the upstream packet loss, the distribution server further performs the following processes.

With reference to the sixth possible implementation of the first aspect, in a tenth possible implementation of the first aspect, the method further includes: if an ACK repeated for M times that is sent by the downstream node or the user terminal is received before the third upstream data packet retransmitted by the upstream node is received, waiting for the upstream node to retransmit the third upstream data packet, where the ACK repeated for M times is for the first upstream data packet; and after the retransmitted third upstream data packet is received, performing the steps of copying the third upstream data packet, converting, based on the connection mapping table, a first packet in two packets obtained through copying, and sending a fourth downstream data packet obtained through conversion to the downstream node or the user terminal.

With reference to the sixth possible implementation of the first aspect, in an eleventh possible implementation of the first aspect, the method further includes: if an ACK repeated for M times that is sent by the downstream node or the user terminal is received after the third upstream data packet retransmitted by the upstream node is received, sending, to the downstream node or the user terminal, a sixth downstream data packet that is stored in a buffer and that matches the third upstream data packet.

According to a second aspect, a distribution server is provided, where the server is configured to perform the data distribution method according to the first aspect.

Beneficial effects brought by the technical solutions provided in the embodiments of this disclosure are as follows.

For two continuously received upstream data packets, regardless of whether sequence numbers of the two packets are consecutive, the distribution server copies each upstream data packet to obtain two packets, where data forwarding is immediately performed on one packet, and control management is performed on the other packet. In the embodiments of this disclosure, the data distribution process and the control management process are separated, and there is no need to distribute a data packet after control management is performed on the data packet, so as to greatly shorten a time consumed for forwarding the data packet. In addition, regardless of whether a packet loss occurs, the distribution server immediately forwards a packet after receiving the packet, so as to greatly shorten a data distribution delay.

DETAILED DESCRIPTION OF ILLUSTRATIVE EMBODIMENTS

To make the objectives, technical solutions, and advantages of this disclosure clearer, the following further describes the implementations of this disclosure in detail with reference to the accompanying drawings.

Before the embodiments of this disclosure are described in detail, some terms that may be used in the embodiments of this disclosure are first described.

Figure 1:
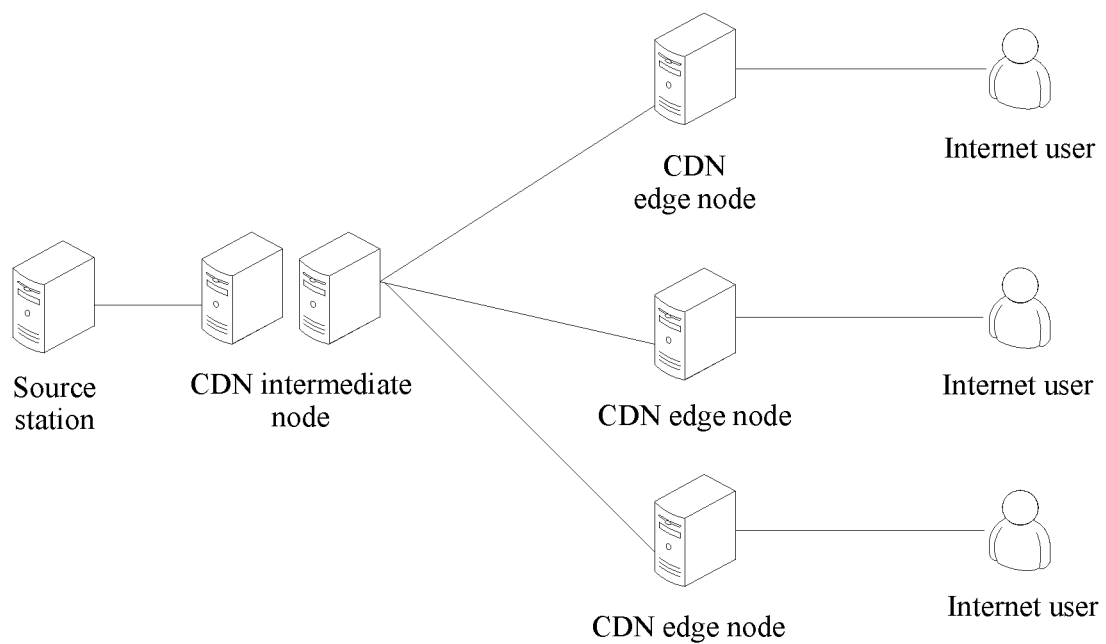
FIG. 1 is a schematic structural diagram of a CDN network according to the background of this disclosure.
Figure 2:
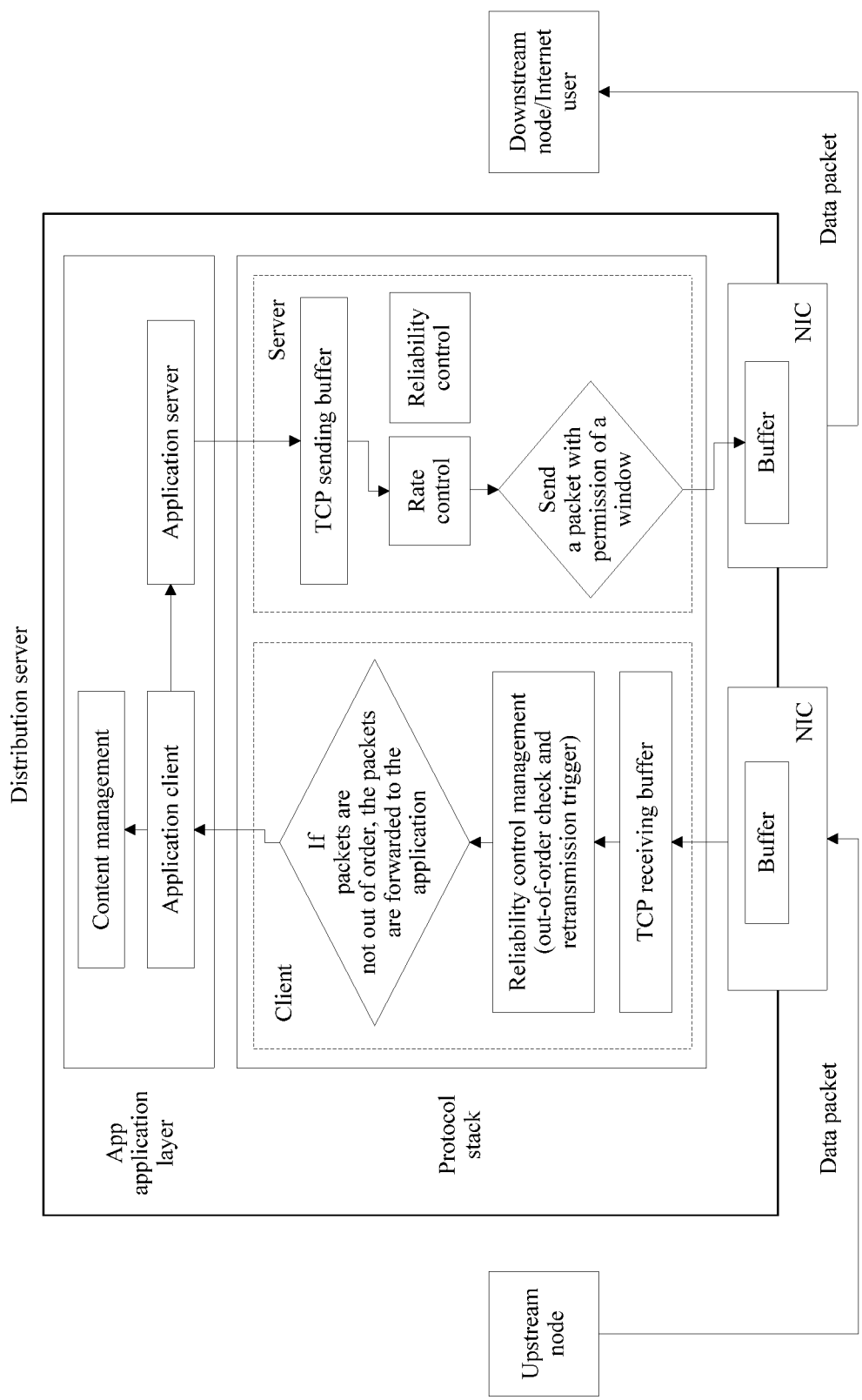
FIG. 2 is a schematic diagram of an internal architecture of a distribution server according to the background of this disclosure.
Figure 3:
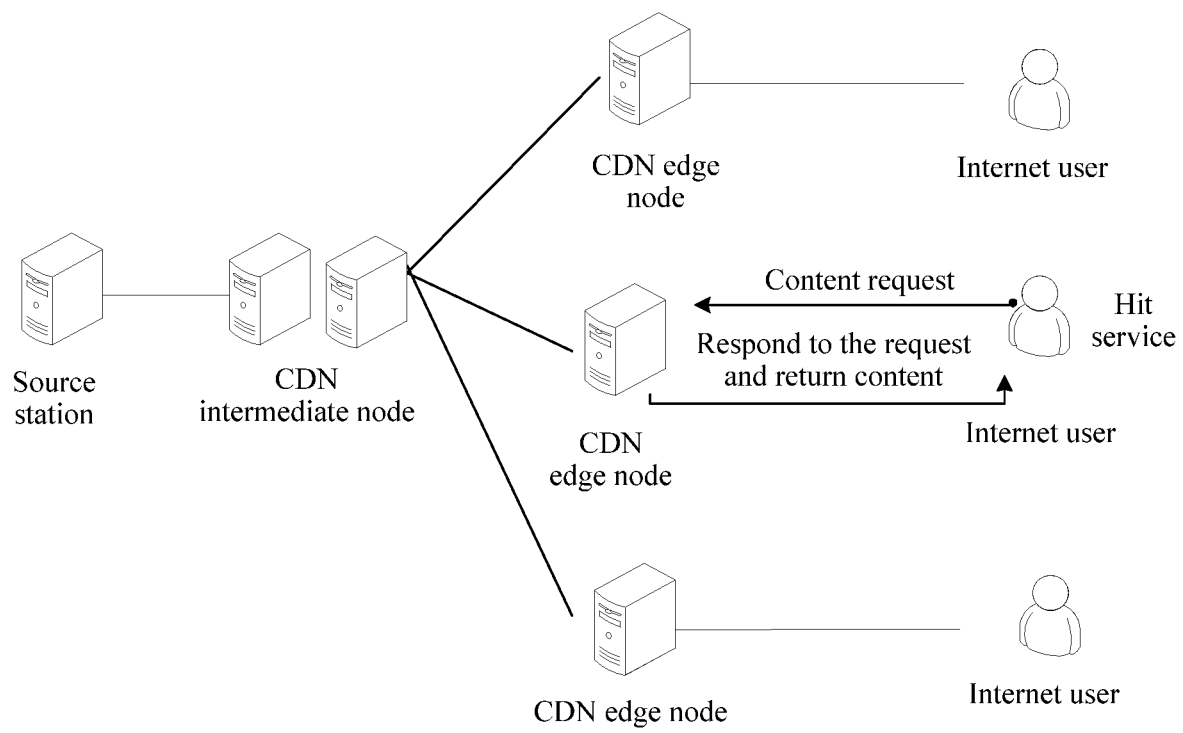
FIG. 3 is a schematic scenario diagram of a CDN hit service according to an embodiment of this disclosure.

Hit service: As shown in FIG. 3, if a distribution server has stored data requested by a content request, the distribution server directly responds to the content request without forwarding the content request to a higher-level CDN node. FIG. 3 shows a case in which a CDN edge node stores the data requested by the received content request. As shown in FIG. 3, the CDN edge node directly responds to the received content request, and returns response data to a user terminal.

Figure 4:
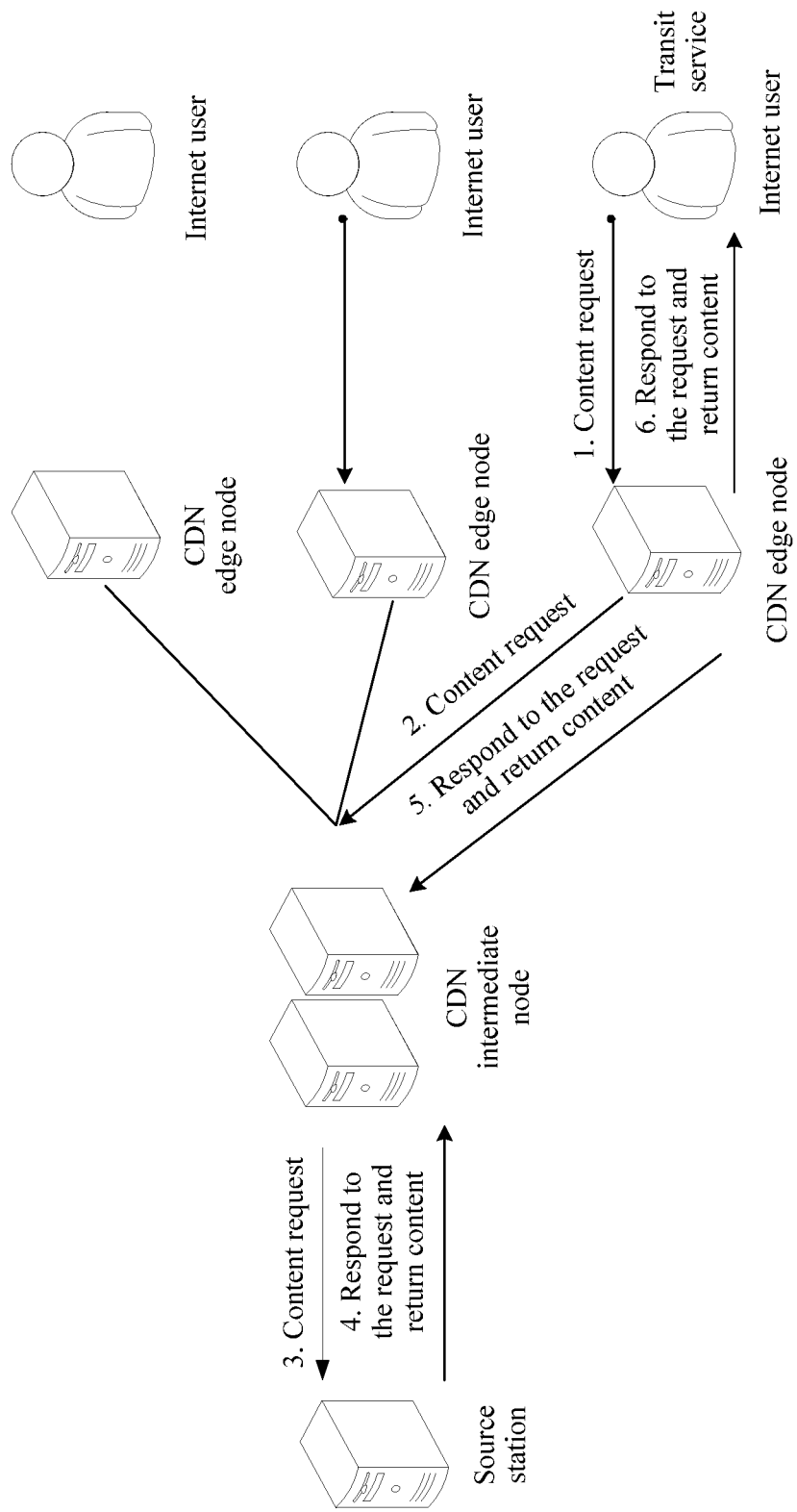
FIG. 4 is a schematic scenario diagram of a CDN transit service according to an embodiment of this disclosure.

Transit service: As shown in FIG. 4, if neither a CDN intermediate node nor a CDN edge node stores data requested by a content request, the CDN node transits the content request until the content request arrives at a source station. Finally, the source station provides response data, and each CDN node transits the response data level by level, to distribute the response data to the user terminal. Each sequence number in FIG. 4 represents a sequence of data request and data distribution.

It should be noted that, because common static content such as a video and a picture provided by each video website remains unchanged for a long time, the static content may be buffered in a distribution server serving as a CDN station, for example, the CDN intermediate node and the CDN edge node shown in FIG. 3 and FIG. 4. The CDN station provides the hit service. When an on-live video (for example, an on-live competition and an on-live hot event), dynamic content (for example, the source station needs to generate a web page in real time), and static content are distributed for the first time, the foregoing distribution server needs to provide the transit service, and the source station provides the hit service.

In another embodiment, the foregoing distribution server is usually further used to store content nearby that can be buffered, for example, an on-demand video and a static picture, to serve a user nearby, so as to reduce consumption of a transmission network bandwidth, and improve user terminal experience. It should be further noted that, for content posing a strict requirement on real-time performance, for example, a virtual reality (VR) video, an on-live video, and dynamic content, a CDN network including the CDN intermediate node and the CDN edge node is usually used to provide intelligent routing, in other words, the transit service, to implement low-delay distribution. The source station provides the hit service. The solutions provided in the embodiments of this disclosure focus on how to implement a low-delay distribution service.

To implement the low-delay distribution service, the embodiments of this disclosure provide a distribution server having a low-delay distribution function, so that not only a data distribution path can be shortened and a delay can be shortened, but also a data distribution delay caused by control management can be shortened by separating a data distribution process and a control management process. For brevity, the distribution server provided in the embodiments of this disclosure mainly implements the following improvements.

(1) A TCP thin layer (also referred to as a data forwarding layer) is newly added, is dedicated to performing a data distribution operation in a processing procedure, and performs forwarding without waiting. A forwarding process of the TCP thin layer may be briefly described as follows:

a. Each time the TCP thin layer receives an upstream data packet, the TCP thin layer immediately converts the received upstream data packet based on an established connection mapping table, for example, replaces N-tuple information and a sequence number in the data packet.

b. After the conversion ends, the TCP thin layer immediately sends a downstream data packet obtained through conversion to a downstream node or a user terminal, and performs forwarding without waiting.

It should be noted that control management is not performed in the foregoing process, for example, whether packets are out of order or whether a packet is allowed to be sent, so as to avoid a data distribution delay caused by the control management process.

(2) To separate data distribution and control management, a socket interface is newly added to a protocol stack, and the interface is invoked by an application layer. For a detailed description of the newly added interface of the protocol stack, refer to a subsequent embodiment.

(3) To support separation of the data distribution process and the control management process, after being invoked by the application layer, the protocol stack needs to set a transmission control protocol (TCP) connection, to receive a data packet only for retransmission and no longer distribute the data packet, in other words, the protocol stack implements only control management. The TCP thin layer performs data distribution.

(3) To support the TCP thin layer in performing data distribution, after being invoked by the application layer, the protocol stack needs to invoke an enabling interface of the TCP thin layer, to instruct the TCP thin layer to establish the connection mapping table and enable a data distribution capability of the TCP thin layer. For a detailed description of the enabling interface of the TCP thin layer, refer to a subsequent embodiment.

Before the solutions provided in the embodiments of this disclosure are described in detail, a system architecture or an application scenario of the embodiments of this disclosure is first described below.

Figure 5:
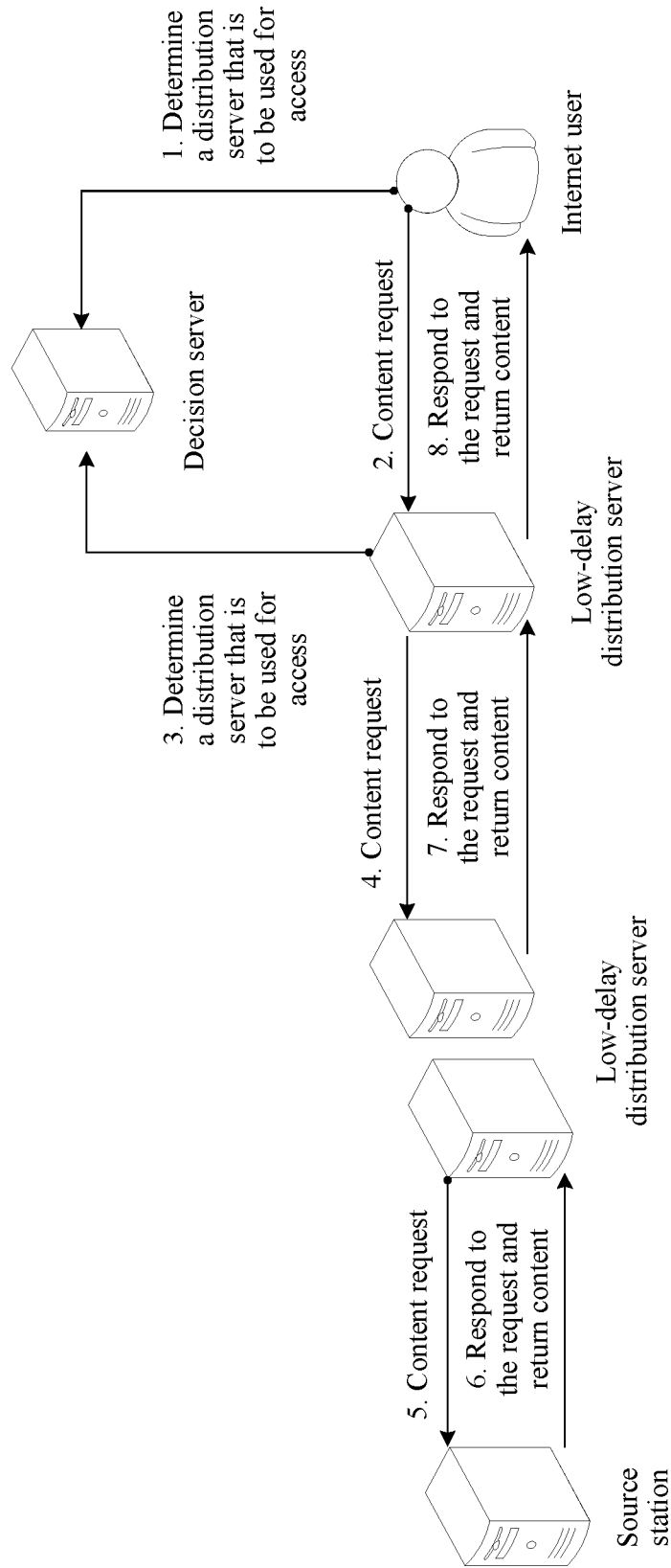
FIG. 5 is a diagram of a first application scenario of a data distribution method according to an embodiment of this disclosure.

FIG. 5 shows a first application scenario of a solution according to an embodiment of this disclosure. To be specific, before initiating a content request, a user terminal first initiates a request to a decision server. The decision server determines a type of a distribution server that serves the content request. For example, a source station application manufacturer may classify domain names of applications into two types based on delay requirements of the applications: one type is a real-time domain name, for example, a domain name including a word such as vr/live/rtmp/dynamic is the real-time domain name. The other type is a non-real-time domain name. Once it is detected that a domain name of the content request initiated by the user terminal is a real-time domain name, an internet protocol (IP) address of a distribution server having a low-delay distribution function is directly returned. Then, a user initiates a content request to the distribution server. The distribution server does not distinguish between Internet users, but enables low-delay distribution for all received content requests. When the distribution server searches for an upstream distribution node, the upstream distribution node may still be determined by the decision server. All distribution servers in the process that have a low-delay distribution function enable a low-delay distribution function for all received content requests by default.

Figure 6:
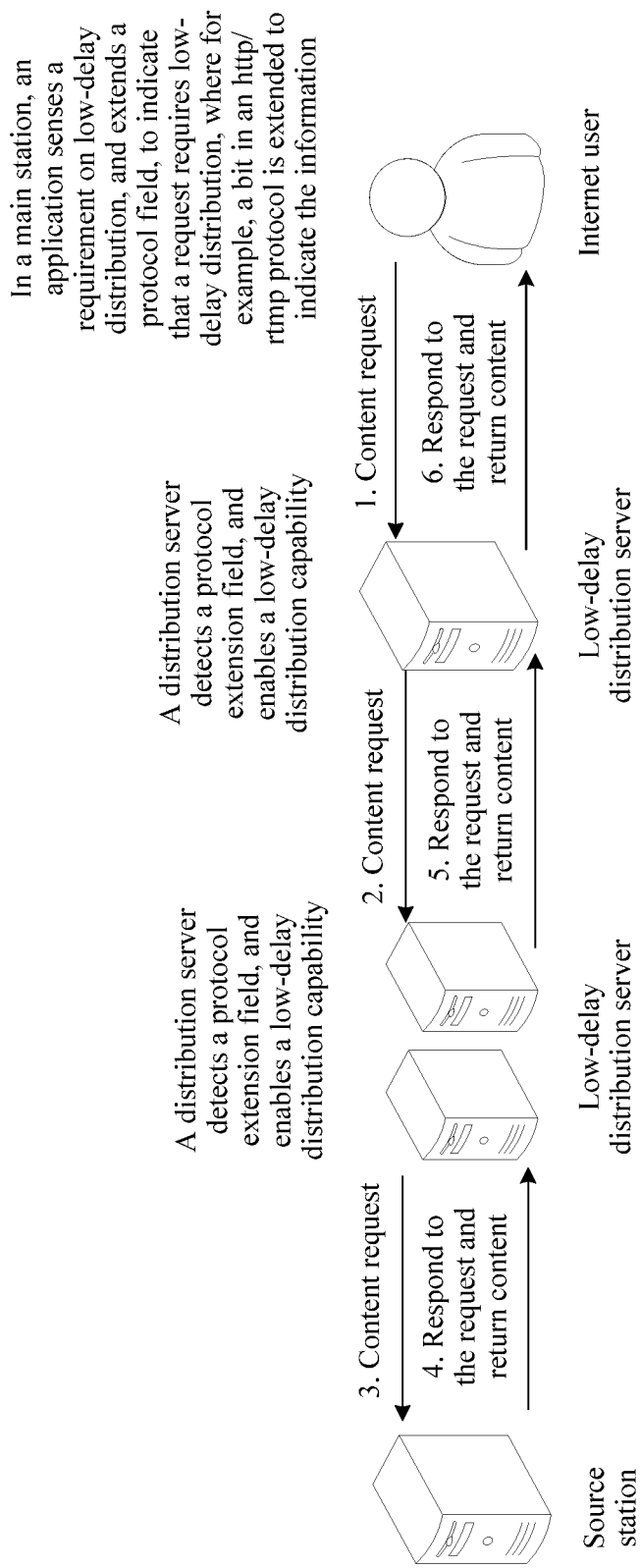
FIG. 6 is a diagram of a first application scenario of a data distribution method according to an embodiment of this disclosure.

FIG. 6 shows a second application scenario of a solution according to an embodiment of this disclosure. To be specific, an application client installed on a user terminal senses a requirement on low-delay distribution. The application client needs to extend a protocol field to carry a flag bit indicating that an initiated content request requires low-delay distribution, and each distribution server in the process automatically identifies the protocol field in a data packet, so as to enable a low-delay distribution capability for a flow to which the data packet belongs, and then perform low-delay forwarding on a subsequent data packet of the flow.

Figure 7:
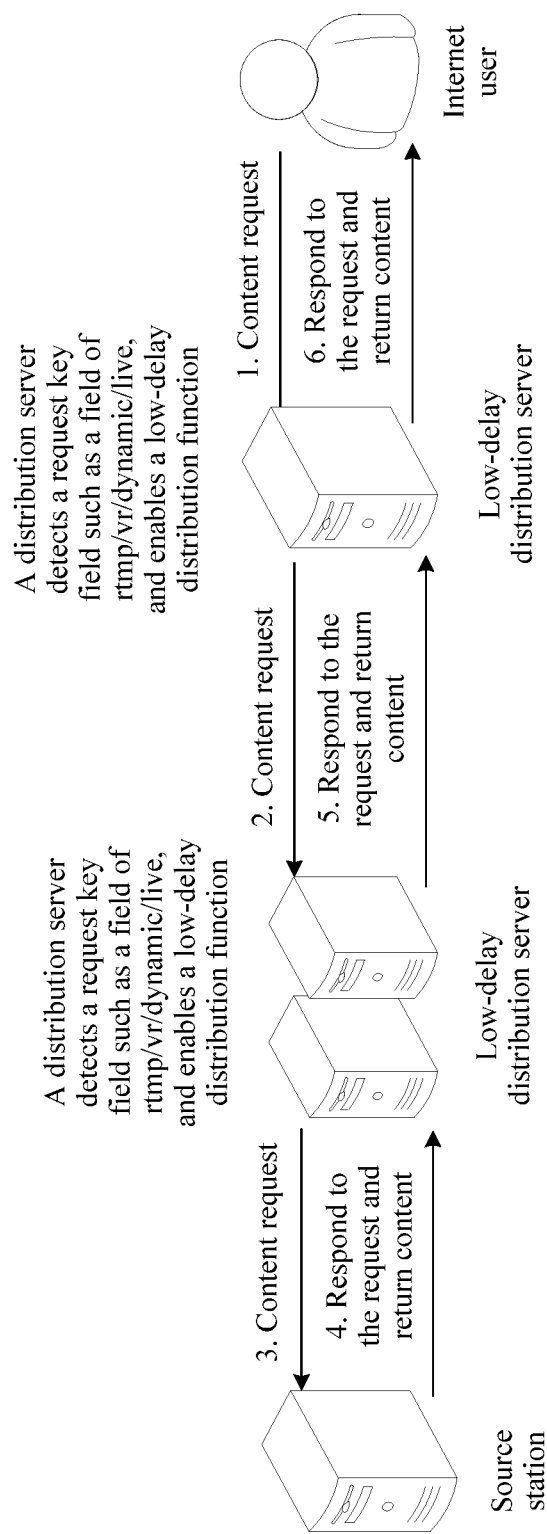
FIG. 7 is a diagram of a first application scenario of a data distribution method according to an embodiment of this disclosure.

FIG. 7 shows a third application scenario of a solution according to an embodiment of this disclosure. To be specific, a distribution server senses a requirement on low-delay distribution. For example, a uniform resource locator (URL) of a content request carries a keyword such as dynamic/vr/live/rtmp. The distribution server automatically enables a low-delay distribution capability for a corresponding flow after sensing the keyword, and then provides low-delay forwarding for a subsequent data packet of the flow.

Figure 8A:
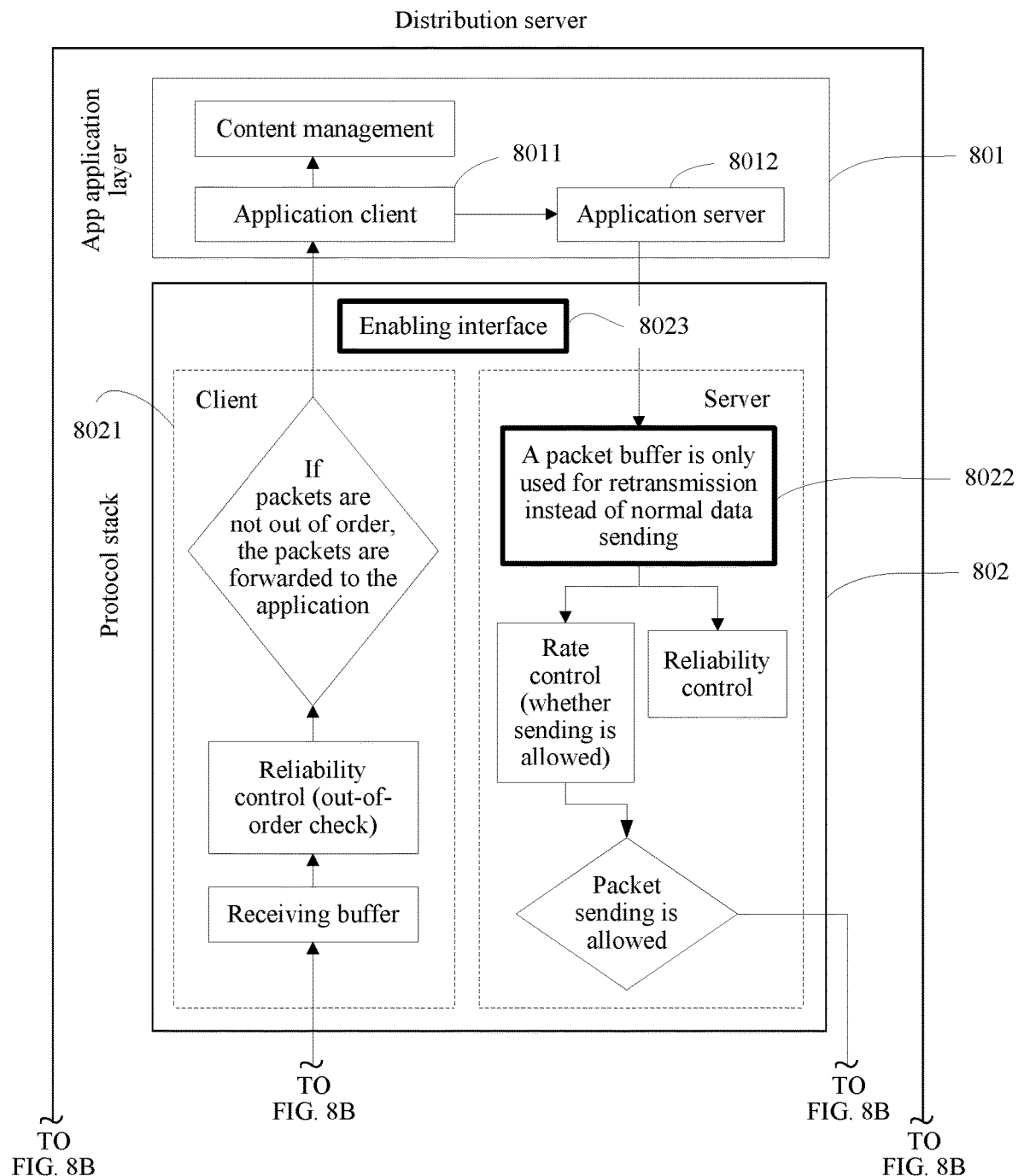
FIG. 8A and FIG. 8B are a schematic diagram of an internal architecture of a distribution server according to an embodiment of this disclosure.
Figure 8B:
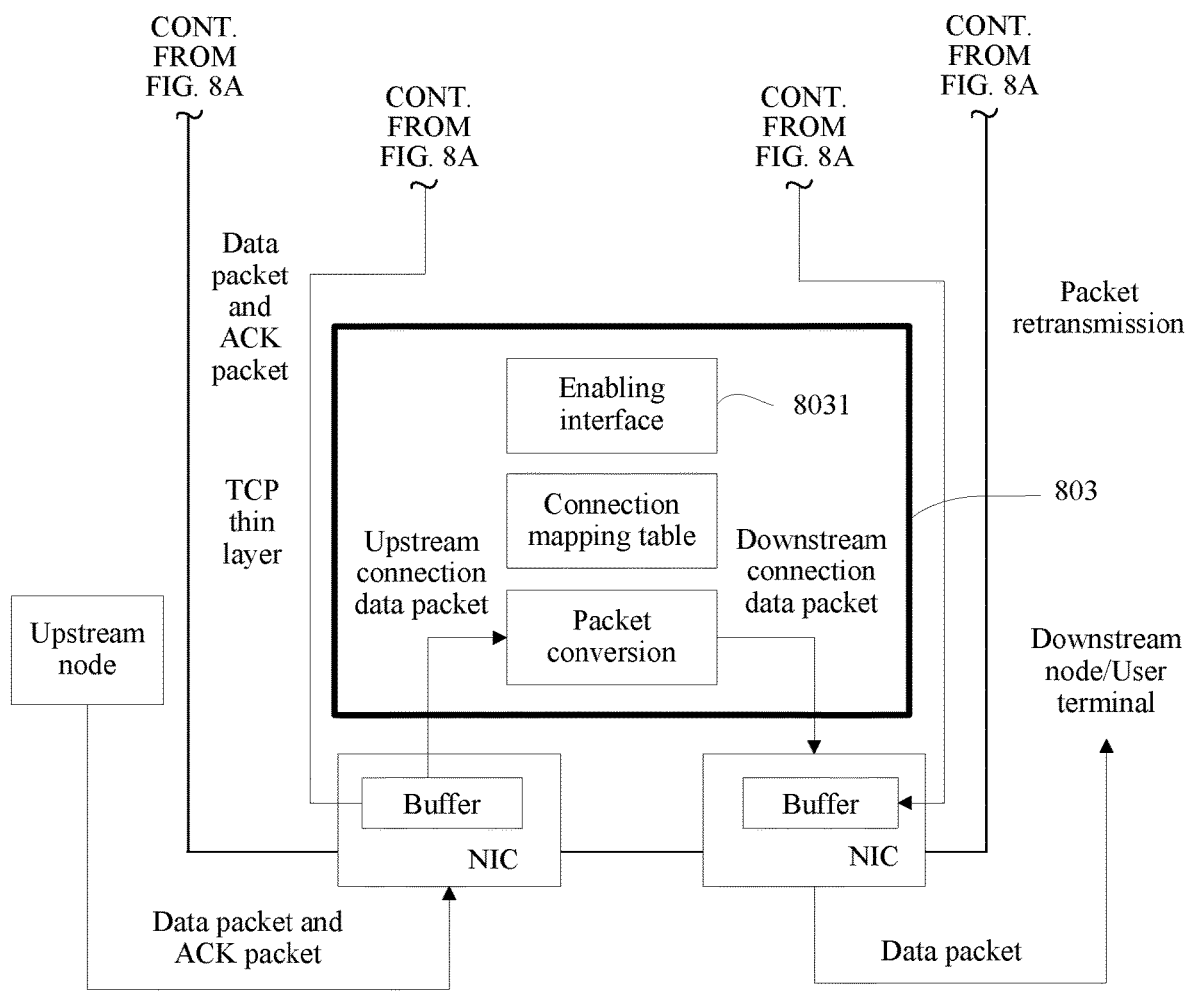

FIG. 8A and FIG. 8B are a schematic diagram of an internal architecture of a distribution server having a low-delay distribution function according to an embodiment of this disclosure. Referring to FIG. 8A and FIG. 8B, the distribution server includes an application layer 801, a protocol stack 802, and a data forwarding layer 803.

The data forwarding layer (also referred to as a TCP thin layer) 803 is responsible for data distribution, and may be implemented by software or hardware. This is not specifically limited in this embodiment of this disclosure. The data forwarding layer 803 includes an enabling interface 8031, and mainly implements the following functions.

(1) The data forwarding layer 803 is invoked by the protocol stack 802 (or the application layer 801) at an upper layer by using the enabling interface 8031, to maintain (for example, newly add/delete) a connection mapping table. The connection mapping table provides upstream connection information and downstream connection information. For example, the connection mapping table provides N-tuple information of an upstream connection, N-tuple information of a downstream connection, and a difference between an initial sequence number of the upstream connection and an initial sequence number of the downstream connection. This is not specifically limited in this embodiment of this disclosure.

(2) Each time the data forwarding layer 803 receives an upstream data packet sent by an upstream node, the data forwarding layer 803 obtains N-tuple information in the upstream data packet, and queries, based on the N-tuple information in the upstream data packet, the established connection mapping table for packet replacement, for example, to replace the N-tuple information in the upstream data packet and modify a sequence number of a TCP connection. In addition, when performing conversion, the data forwarding layer 803 may further perform a related check or modify another field. This is also not specifically limited in this embodiment of this disclosure.

In addition, the protocol stack 802 is responsible for control management. As shown in FIG. 8A and FIG. 8B, in addition to a client module 8021 and a server module 8022, the protocol stack further includes an enabling interface 8023. The newly added enabling interface 8023 is invoked by the application layer 801 to enable the protocol stack 802 to separate data distribution and control management, so that the data distribution function of the protocol stack 802 is excluded, and only the control management function is retained.

In this embodiment of this disclosure, the enabling interface 8023 needs to carry an upstream/downstream connection identifier and an enabling flag for instructing to separate the data forwarding function and the control management function. The upstream/downstream connection identifier such as an upstream/downstream connection descriptor and the enabling flag are mainly used to instruct the protocol stack 802 to separate data distribution and control management.

In addition, the protocol stack 802 needs to exclude the data distribution function, to be specific, when being invoked by the application layer 801 for data distribution, the protocol stack 802 only encapsulates a received data packet into a TCP packet and stores the TCP packet in a buffer, but does not send the TCP packet. The TCP packet is merely used for subsequent control management. For the foregoing case, the protocol stack 802 further needs to reset a timeout timer (namely, a retransmission timer). When receiving a normal ACK of a downstream node or a user terminal, the protocol stack 802 deletes the corresponding TCP packet in the buffer, and updates the timeout timer. When the protocol stack 802 receives an ACK repeated for three times of a downstream node or a user terminal, or when the timeout timer expires, the protocol stack 802 extracts the corresponding TCP packet from the buffer for retransmission according to a congestion control mechanism.

The application layer 801 includes a client module 8011 and a server module 8012. In another embodiment, the enabling interface 8031 of the data forwarding layer 803 may further need to be invoked, so that the data forwarding layer 803 maintains the connection mapping table and enables the data distribution function. For a description of this part, refer to a subsequent embodiment.

According to the distribution server provided in this embodiment of this disclosure, the TCP thin layer dedicated to converting and sending a data packet is added, a low-delay distribution capability of the TCP thin layer is enabled, the data forwarding function of the protocol stack is excluded, and only the control management function of the protocol stack is retained, so that the control management function and the data forwarding function of the protocol stack are separated, and impact imposed by the control management process on the data forwarding process is reduced. Therefore, the TCP thin layer can immediately convert and send a received data packet, so as to shorten a path for forwarding the data packet, and greatly shorten a delay.

Figure 9A:
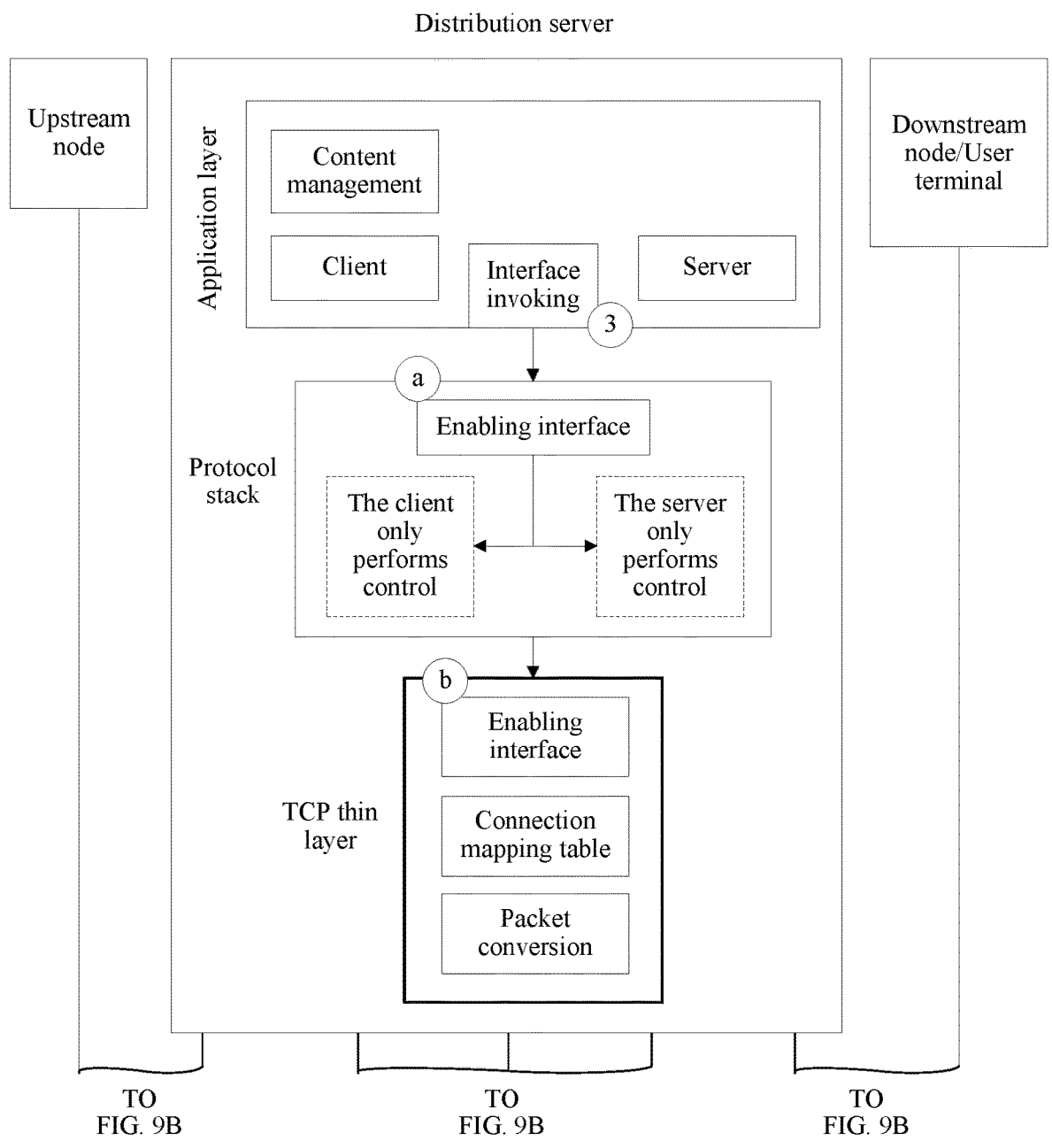
FIG. 9A, FIG. 9B, and FIG. 9C are a flowchart of core processing of a data distribution method according to an embodiment of this disclosure.
Figure 9B:
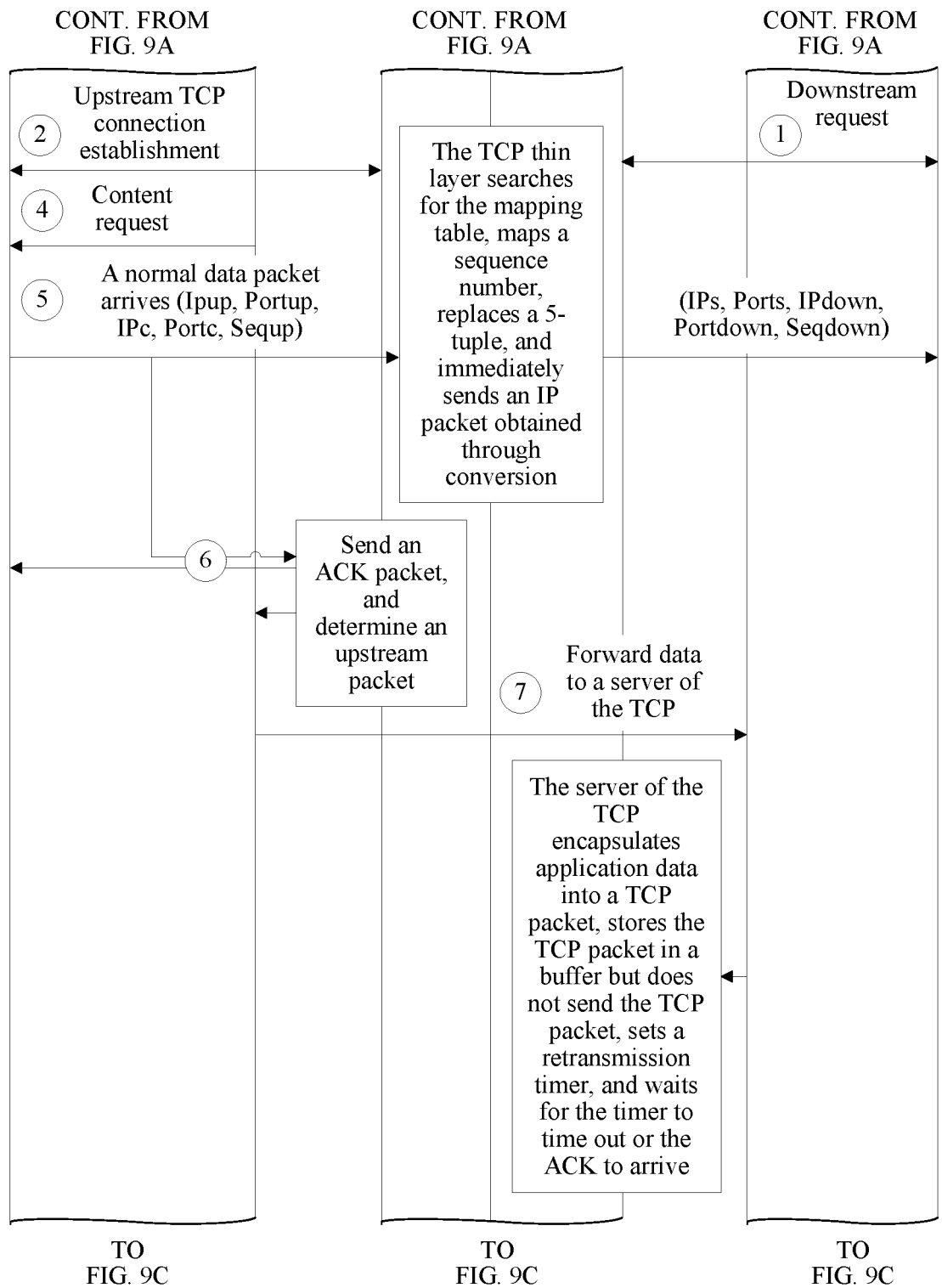
Figure 9C:
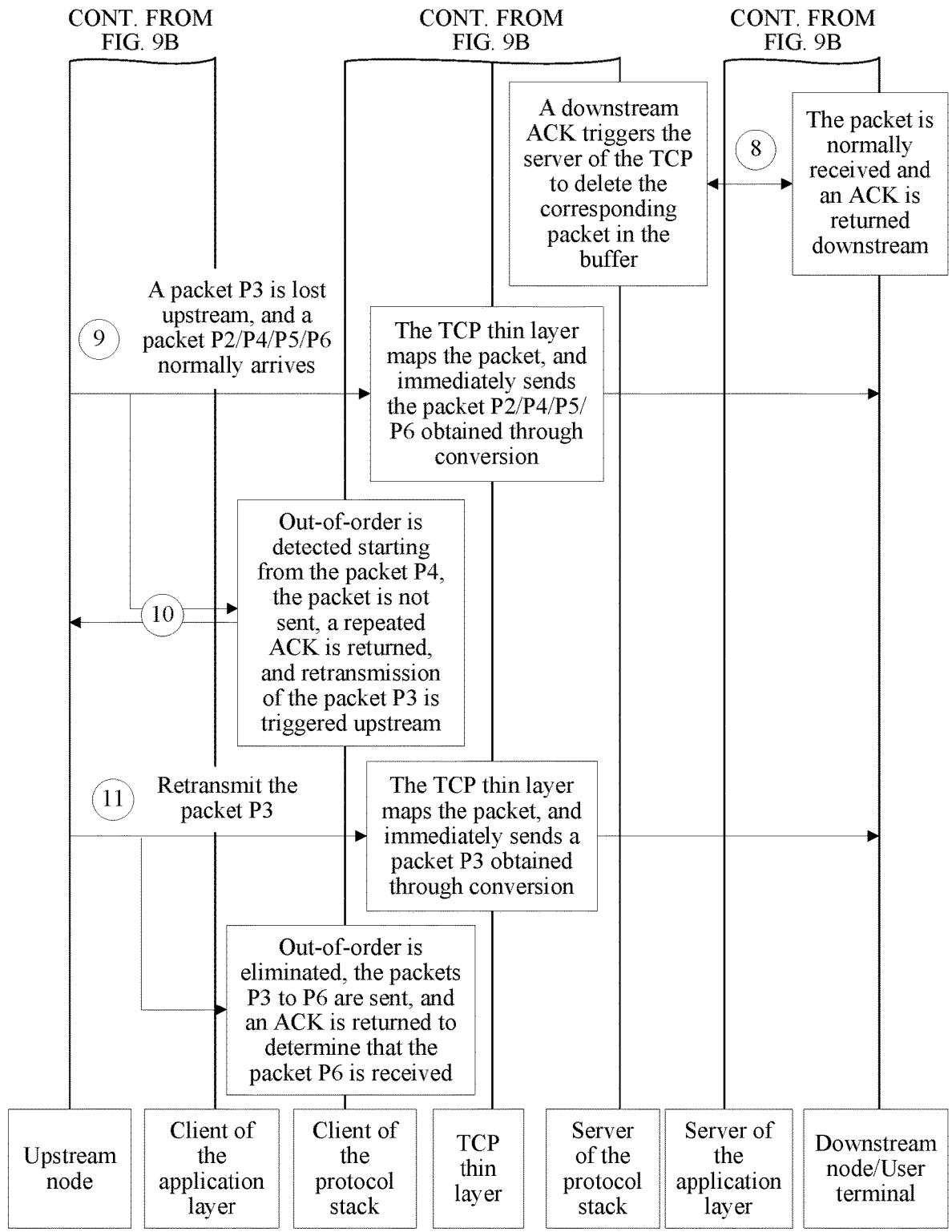

A core processing procedure of completing low-delay distribution in this embodiment of this disclosure is briefly summarized below with reference to the structural diagram of the distribution server having the low-delay distribution function that is described in FIG. 8A and FIG. 8B. FIG. 9A, FIG. 9B, and FIG. 9C are a flowchart of core processing of a solution according to an embodiment of this disclosure.

Step 1: A downstream node or a user terminal initiates a request to a distribution server. The request first arrives at a connection request of a server of a protocol stack, and then arrives at a content request of a server of an application layer.

Step 2: After detecting that content requested by a user is not locally stored, the distribution server triggers a client of the application layer to initiate a connection request to an upstream node.

Step 3: After establishing a connection to the upstream node, the application layer invokes an enabling interface of the protocol stack to control the protocol stack to separate data forwarding and control management for an upstream/downstream connection, so that the protocol stack invokes an enabling interface of a TCP thin layer, to instruct the TCP thin layer to establish a connection mapping table for the upstream/downstream connection and enable a low-delay forwarding capability.

Step 4: The client of the application layer initiates the content request to the upstream node.

Step 5: An upstream data packet sent by the upstream node normally arrives at the distribution server, and the TCP thin layer searches for the connection mapping table, and performs conversion, for example, replaces N-tuple information and sequence number information in the upstream data packet, to convert the upstream data into a downstream data packet, and then the TCP thin layer immediately sends the downstream data packet to the downstream node or the user terminal.

Step 6: The distribution server sends the upstream data packet to the protocol stack, and the protocol stack is responsible for checking whether data packets are out of order, and if the data packets are not out of order, sends a normal ACK to the upstream node to determine that the data packet is received.

Step 7: A client of the protocol stack sends the upstream data packet to the client of the application layer, so that the client of the application layer forwards the upstream data packet to the server of the application layer, and then sends the upstream data packet to the server of the protocol stack. In this case, the server of the protocol stack encapsulates the upstream data packet into a TCP packet and then places the TCP packet in a buffer, but does not send the TCP packet. The server of the protocol stack sets a timeout timer and retransmits the TCP packet after the timeout timer expires, or deletes the TCP packet after receiving a normal ACK returned by the downstream node or the user terminal.

Step 8: The downstream node or the user terminal normally receives the downstream data packet and returns an ACK, and the server of the protocol stack deletes the corresponding TCP packet in the buffer and updates the timeout timer after receiving the ACK.

Step 9: If a packet loss occurs on the upstream node, for example, an upstream data packet P2/P4/P5/P6 normally arrives, but an upstream data packet P3 does not arrive, the TCP thin layer converts the received upstream data packet P2/P4/P5/P6, and then immediately sends a data packet obtained through conversion.

Step to: When receiving the upstream data packet P4/P5/P6, the protocol stack finds that the packets are out of order (the upstream data packet P3 is not received, and the upstream data packet P4 is after the upstream data packet P2), and therefore the protocol stack sends a repeated ACK for the upstream data packet P2 each time receiving an upstream data packet.

Step 11: When receiving the ACK repeated for three times, the upstream node retransmits the upstream data packet P3, and the TCP thin layer converts the upstream data packet P3 and then immediately sends a data packet obtained through conversion. In this case, the protocol stack detects that the packets are not out of order, and therefore forwards the upstream data packets P2 to P6 to the client of the application layer, and then forwards the upstream data packets P2 to P6 to the server of the protocol stack.

In addition, for a downstream packet loss, refer to a subsequent embodiment.

Figure 10A:
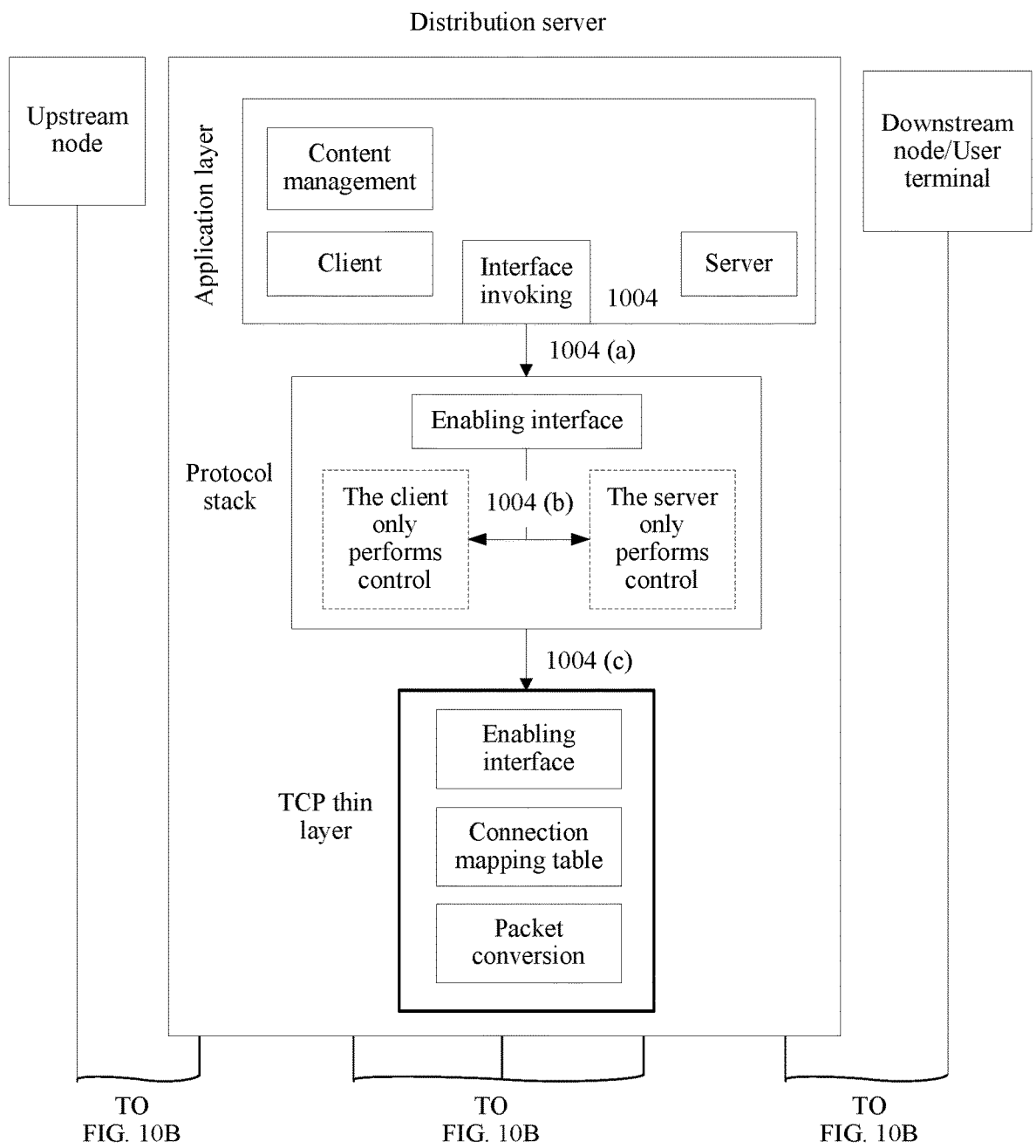
FIG. 10A, FIG. 10B, and FIG. 10C are a flowchart of a first data distribution method according to an embodiment of this disclosure.
Figure 10B:
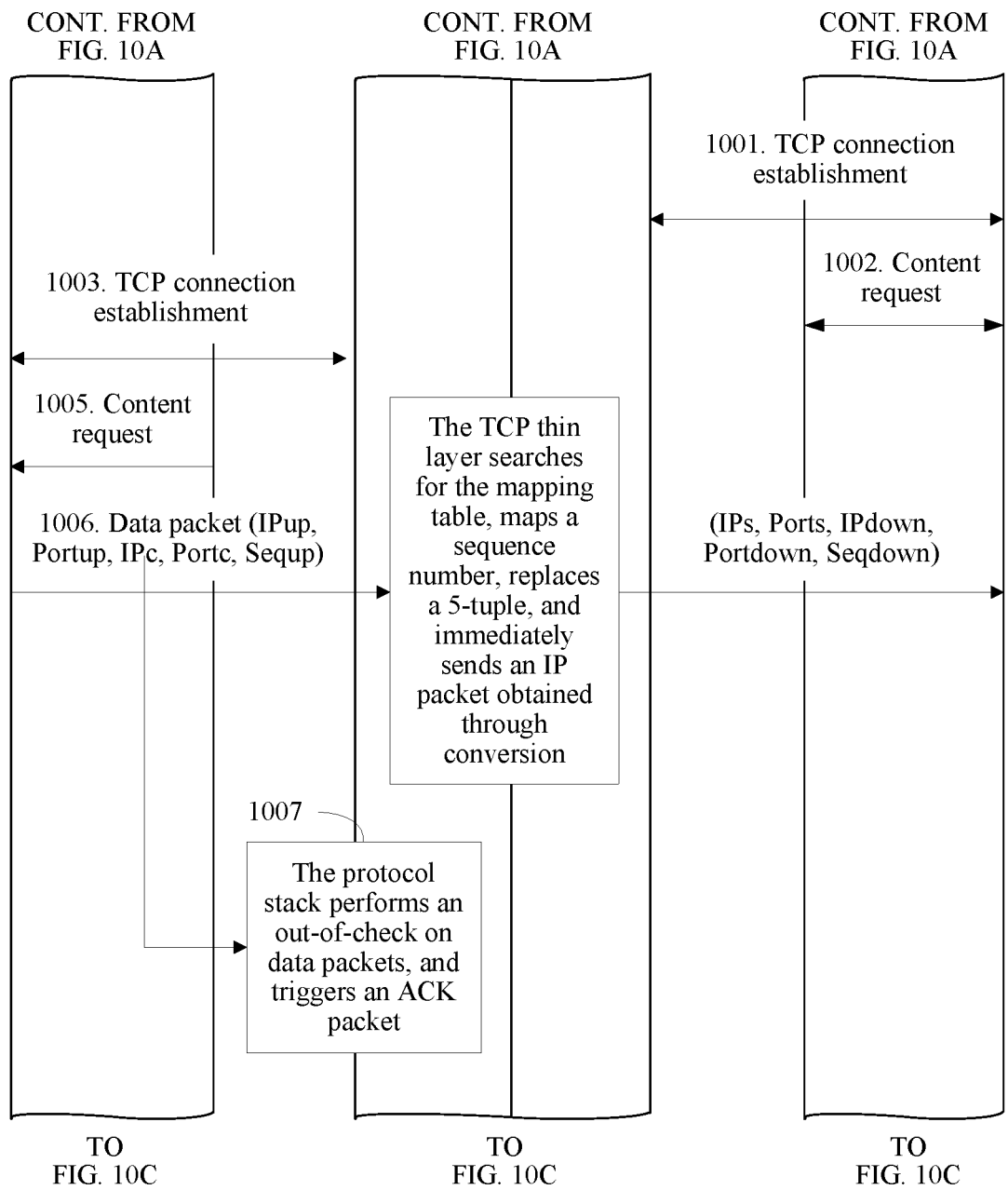
Figure 10C:
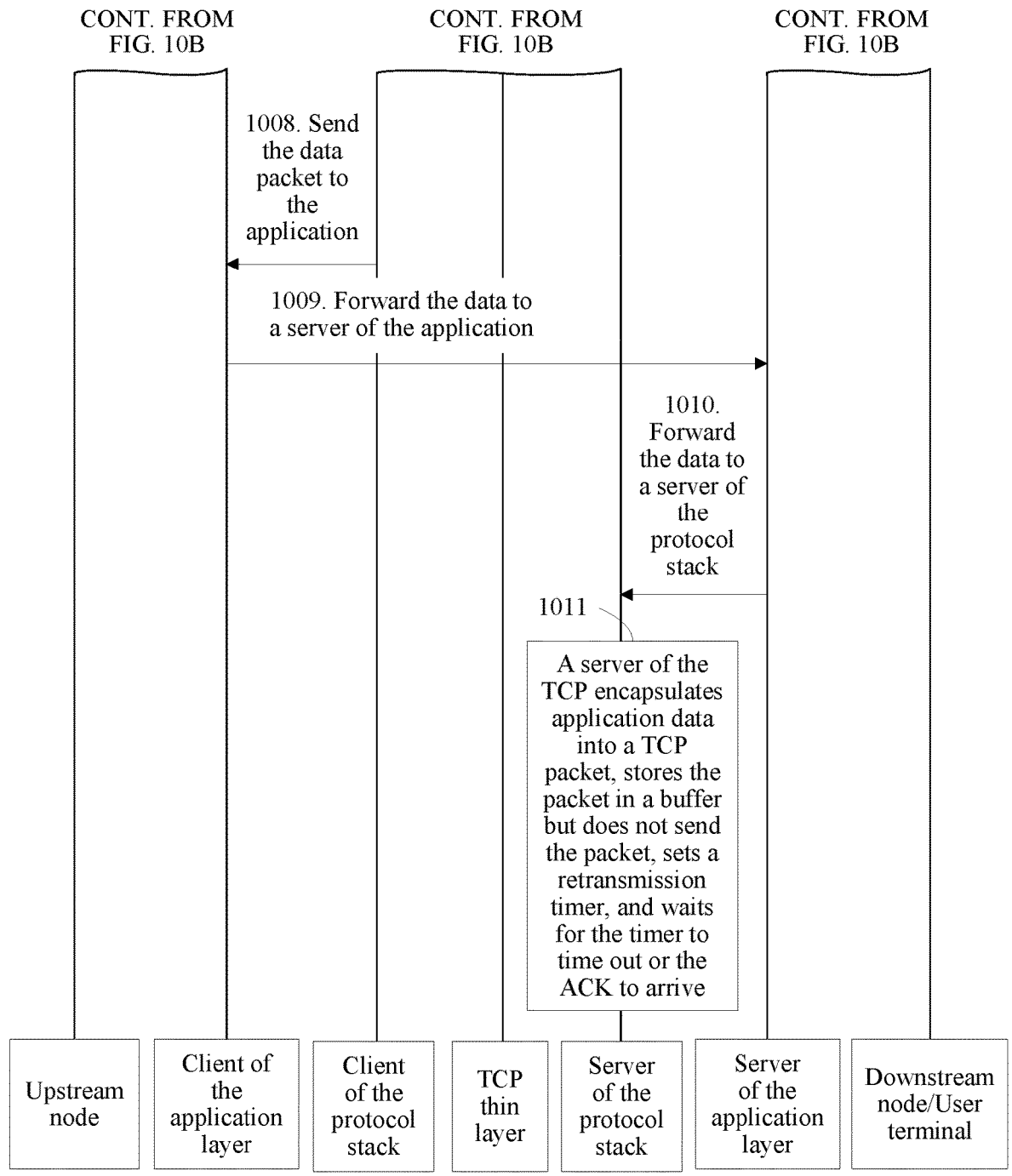

FIG. 10A, FIG. 10B, and FIG. 10C are a flowchart of a data distribution method according to an embodiment of this disclosure. A process of enabling a low-delay distribution capability and a process of performing data distribution without a packet loss are mainly provided in this embodiment. Referring to FIG. 10A, FIG. 10B, and FIG. 10C, a procedure of the method provided in this embodiment of this disclosure includes the following steps.

1001. A downstream node/user terminal performs a TCP three-way handshake with a distribution server, to establish a TCP connection.

The TCP connection established in this step is a downstream connection. A peer end that establishes a connection to the downstream node/user terminal is a server of a protocol stack in the distribution server.

1002. The downstream node/user terminal sends a content request to the distribution server by using the established downstream connection.

The content request finally arrives at a server of an application layer in the distribution server.

In addition, for the content request, a plurality of protocols such as the HTTP and the RTMP may be used. After receiving the content request, the server of the application layer checks a local buffer. If data requested by the content request is not locally stored, the server of the application layer triggers a client of the protocol stack to initiate, to an upstream node, a request for establishing the TCP connection.

1003. A client of the application layer triggers the client of the protocol stack to initiate, to the upstream node, a request for establishing a TCP connection, and an upstream connection is successfully established after a TCP three-way handshake is performed. The upstream connection corresponds to the downstream connection mentioned in step 1001. Details are not described herein.

It should be noted that, before the client of the application layer initiates a content request to the upstream node, this embodiment of this disclosure further includes a step of first enabling a low-delay distribution capability of the distribution server. For details, refer to the following steps 1004 (a) to 1004 (c).

1004 (a). The application layer invokes a first enabling interface of the protocol stack, to instruct the protocol stack to enable a low-delay distribution capability.

To distinguish between a newly added enabling interface of the protocol stack and a subsequent enabling interface of a TCP thin layer, the foregoing two enabling interfaces are respectively identified by using the first enabling interface and a second enabling interface in this embodiment of this disclosure.

In this embodiment of this disclosure, the newly added enabling interface of the protocol stack carries an upstream/downstream connection identifier and an enabling flag for instructing to separate a data forwarding function and a control management function. The upstream/downstream connection identifier may include an upstream/downstream connection descriptor fd_client or fd_server. This is not specifically limited in this embodiment of this disclosure. The newly added first enabling interface may be in a setsockopt API form, for example, int setsockopt(int sockfd, int level, int optname,const void *optval, socklen_t optlen), where "optval" carries the upstream/downstream connection identifier indicating that control management and data forwarding need to be separated, and "optname" carries the enabling flag for instructing to separate data distribution and control management, and represents low-delay distribution. For example, a value of "optname" may be TCP_ZERODELAY, where TCP_ZERODELAY represents forwarding without waiting.

1004 (b). After being invoked by the application layer, the protocol stack separates the data forwarding function and the control management function of the upstream/downstream connection.

During separation, a data forwarding function and a control management function of a TCP connection corresponding to "fd_server" are specifically separated, to be specific, a data packet is received after the action is performed, the data packet is only encapsulated into a TCP packet but is not sent, and control management is triggered by a timeout or an ACK; or a data forwarding function and a control management function of a TCP connection corresponding to "fd_client" are specifically separated, to be specific, a data packet is received after the action is performed, the data packet is only encapsulated into a TCP packet but is not sent, and control management is triggered by a timeout or an ACK.

It should be noted that processing of the TCP connection corresponding to fd_server is mainly for data that is forwarded by the upstream node to the node and then is forwarded to the downstream node or the user terminal, which is a typical case in CDN distribution. Therefore, only this case is described in detail in this solution. Processing of the TCP connection corresponding to fd_client is similar to that, and is not described in this solution.

1004 (c). After being invoked by the application layer, the protocol stack invokes the second enabling interface of the TCP thin layer, to instruct the TCP thin layer to establish a connection mapping table and enable a low-delay distribution capability of the TCP thin layer.

In this embodiment of this disclosure, in addition to the separation operation, the protocol stack further needs to enable the low-delay distribution capability of the TCP thin layer. Therefore, after being invoked by the application layer, the protocol stack invokes the second enabling interface of the TCP thin layer, to instruct the TCP thin layer to establish the connection mapping table and enable the low-delay distribution capability of the TCP thin layer, and instruct the TCP thin layer to convert, based on the established connection mapping table, all subsequently received data packets meeting a connection mapping condition. Then, the protocol stack directly forwards obtained data packets.

The second enabling interface of the TCP thin layer is, for example, in the following form:

int settcpmap(const void *client_conn_info, void *server_conn_info, bool enable),
where "client_conn_info" carries upstream connection information, and may include N-tuple information (for example, a source IP/port and a destination IP/port) and an initial sequence number; and "server_conn_info" carries downstream connection information, and may include N-tuple information (for example, a source IP/port and a destination IP/port) and an initial sequence number. For "enable", "true" indicates that the connection mapping table is established, and "false" indicates that the connection mapping table is deleted.

It should be noted that the TCP thin layer needs to establish two connection mapping tables, where one represents that data is sent from upstream to downstream, and the other represents that data is sent from downstream to upstream. Implementation methods of the two connection mapping tables are the same. In this embodiment of this disclosure, only an example in which the data is sent from the upstream to the downstream is used for description. For this scenario, the connection mapping table is, for example, in a form shown in Table 1.

TABLE 1

| Src | dst | seq_diff |
|---|---|---|
| N-tuple information of an upstream connection | N-tuple information of a downstream connection | Difference between initial sequence numbers of an upstream connection and a downstream connection |

It is assumed that N-tuple information is four-tuple information. The four-tuple information of the upstream connection is (IPup, Portup, IPc, and Portc), and the initial sequence number of the upstream connection is "Sequpinit". The four-tuple information of the downstream connection is (IPs, Ports, IPdown, and Portdown), and the initial sequence number of the downstream connection is "Seqdowninit".

"IPup" and "Portup" represent a sensing address and a port of the upstream node, "IPc" and "Portc" represent an address and a port that are used when the distribution server initiates the upstream connection, "IPs" and "Ports" represent a sensing address and a port of the distribution server, and "IPdown" and "Portdown" represent an address and a port that are used when the downstream node initiates the downstream connection. When the data is sent from upstream to downstream, the corresponding connection mapping table may be Table 2 instead of Table 1.

TABLE 2

| Src | dst | seq_diff |
|---|---|---|
| IPup, Portup, IPc, Portc | IPs, Ports, IPdown, Portdown | Seqdowninit-Sequpinit |

In Table 1 and Table 2, "Src" is used as an index, to be specific, when receiving an upstream data packet, the TCP thin layer extracts N-tuple information of the upstream data packet, and compares the N-tuple information of the upstream data packet with "Src" in the connection mapping table. When same "Src" occurs, mapping conversion, in other words, conversion is performed by using the mapping entries "dst" and "seq_diff". It should be noted that a common hash method and the like may be further used herein to store the mapping entries and accelerate an indexing process. This is not specifically limited in this embodiment of this disclosure.

In another embodiment, when a connection to any one of the upstream node and the downstream node/user terminal is disconnected or an exception occurs, the protocol stack invokes the newly added first enabling interface, sets "enable" to "false", instructs the TCP thin layer to delete the established connection mapping table, and disables a low-delay distribution service for the flow.

1005. The client of the application layer initiates a content request to the upstream node by using the established upstream connection.

1006. The upstream node sends an upstream data packet to the distribution server by using the established upstream connection, and the distribution server first sends a data packet obtained by copying the upstream data packet to the TCP thin layer, so that the TCP thin layer performs low-delay distribution.

In another expression manner, after the TCP thin layer receives the upstream data packet sent by the upstream node, the TCP thin layer converts the upstream data packet based on the established connection mapping table, to obtain a downstream data packet, and immediately forwards the downstream connection packet obtained through conversion.

A specific process in which the TCP thin layer performs conversion is as follows.

First, the TCP thin layer extracts N-tuple information in the upstream data packet, uses the N-tuple information as a key, and searches the established connection mapping table for a target mapping entry matching the key. Then, the TCP thin layer converts the upstream data packet by using "dst" and "seq_diff" in the target mapping entry.

It is assumed that the N-tuple information is (IPup, Portup, IPc, Portc), and the found target mapping entry is:

| Src | dst | seq_diff |
|---|---|---|
| IPup, Portup, IPc, Portc | IPs, Ports, IPdown, Portdown | Seqdowninit-Sequpinit |

N-tuple information in the downstream data packet obtained through conversion is (IPs, Ports, IPdown, Portdown), and a sequence number is "Seqdown", whereSeqdown=Sequp+seq_diff.

After obtaining the downstream data packet, the TCP thin layer forwards the downstream data packet. In another expression manner, the TCP thin layer immediately sends an IP packet obtained through conversion to the downstream node or the user terminal.

1007. The distribution server sends another data packet obtained by copying the upstream data packet to the protocol stack, so that the protocol stack performs control management.

It should be noted that in this embodiment, only a case in which data packets arrive in sequence without a packet loss is considered. In this case, the protocol stack determines that the data packets arrive in sequence, in other words, after performing an out-of-order check on the data packets, the protocol stack finds that the packets are not out of order. Therefore, the protocol stack sends a normal ACK to the upstream node.

1008. After the data packets arrive in sequence, the client of the protocol stack sends the upstream data packet to the client of the application layer.

1009. The client of the application layer forwards the upstream data packet to the server of the application layer.

1010. The server of the application layer forwards the upstream data packet to the server of the protocol stack.

1011. After receiving the upstream data packet sent by the server of the application layer, the server of the protocol stack encapsulates the upstream data packet into a TCP packet by using the downstream connection information (for example, the N-tuple information and the sequence number), and places the encapsulated TCP packet in a buffer.

The encapsulated TCP packet is not sent, but is only placed in the buffer. The server of the protocol stack sets a timeout timer, and waits for the ACK of the downstream node/user terminal to trigger deletion of the TCP packet, or waits for the timeout timer to time out to trigger retransmission of the TCP packet.

It can be learned from the foregoing listed implementation processes that the solution described in this embodiment has the following innovation points:

The TCP thin layer is newly added to the distribution server, and the low-delay distribution capability is implemented by the newly added TCP thin layer. To support the low-delay distribution function of the TCP thin layer, the protocol stack is modified, the data distribution function of the protocol stack is excluded, and the control management function and the data distribution function of the protocol stack are separated. The TCP thin layer may be implemented by software or hardware.

Based on this, in the process of performing data distribution without the packet loss, this embodiment is unique in the following processes:

(1) the process in step 1004 (*a*) to step 1004 (*a*) in which the low-delay distribution capability is enabled;

(2) the process in step 1006 in which after receiving the data packet, the TCP thin layer immediately converts and distributes the data packet; and (3) the process in step loll in which after receiving the data packet sent by the server of the application layer, the server of the protocol stack only encapsulates the data packet, but does not forward the data packet.

In an existing solution, after a data packet is received, the data packet is sent to the client of the application layer layer by layer, then is forwarded to the server of the application layer, and then is sent by the server of the protocol stack. Therefore, compared with the existing solution, a forwarding path is shortened, and a delay is shortened according to the data distribution method provided in this embodiment of this disclosure. In addition, in the existing solution, after the application layer forwards the data packet to the server of the protocol stack, the server of the protocol stack does not necessarily immediately send the data packet, but needs to consider a control factor such as a sending rate. However, in this solution, because the TCP thin layer is only responsible for data forwarding, and does not perform any control processing, impact imposed by control processing on data forwarding can be reduced.

According to the method provided in this embodiment of this disclosure, the TCP thin layer dedicated to converting and sending a data packet is added to the distribution server, the low-delay distribution capability of the TCP thin layer is enabled, the data forwarding function of the protocol stack is excluded, and only the control management function of the protocol stack is retained, so that the control management function and the data forwarding function of the protocol stack are separated, and impact imposed by the control management process on the data forwarding process is reduced. Therefore, the TCP thin layer can immediately convert and send a received data packet, so as to shorten a path for forwarding the data packet, and greatly shorten a delay.

Figure 11A:
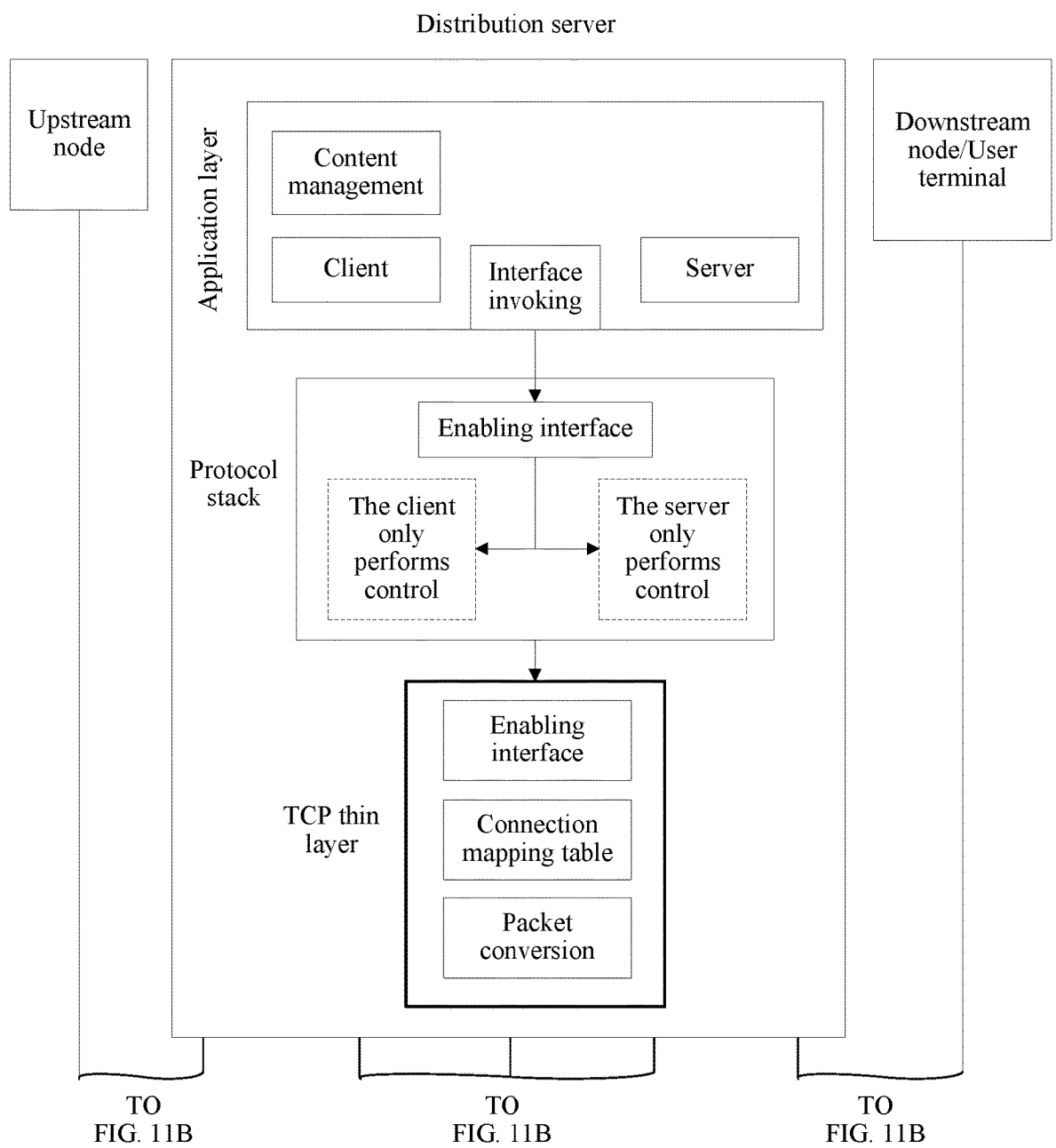
FIG. 11A, FIG. 11B, and FIG. 11C are a flowchart of a second data distribution method according to an embodiment of this disclosure.
Figure 11B:
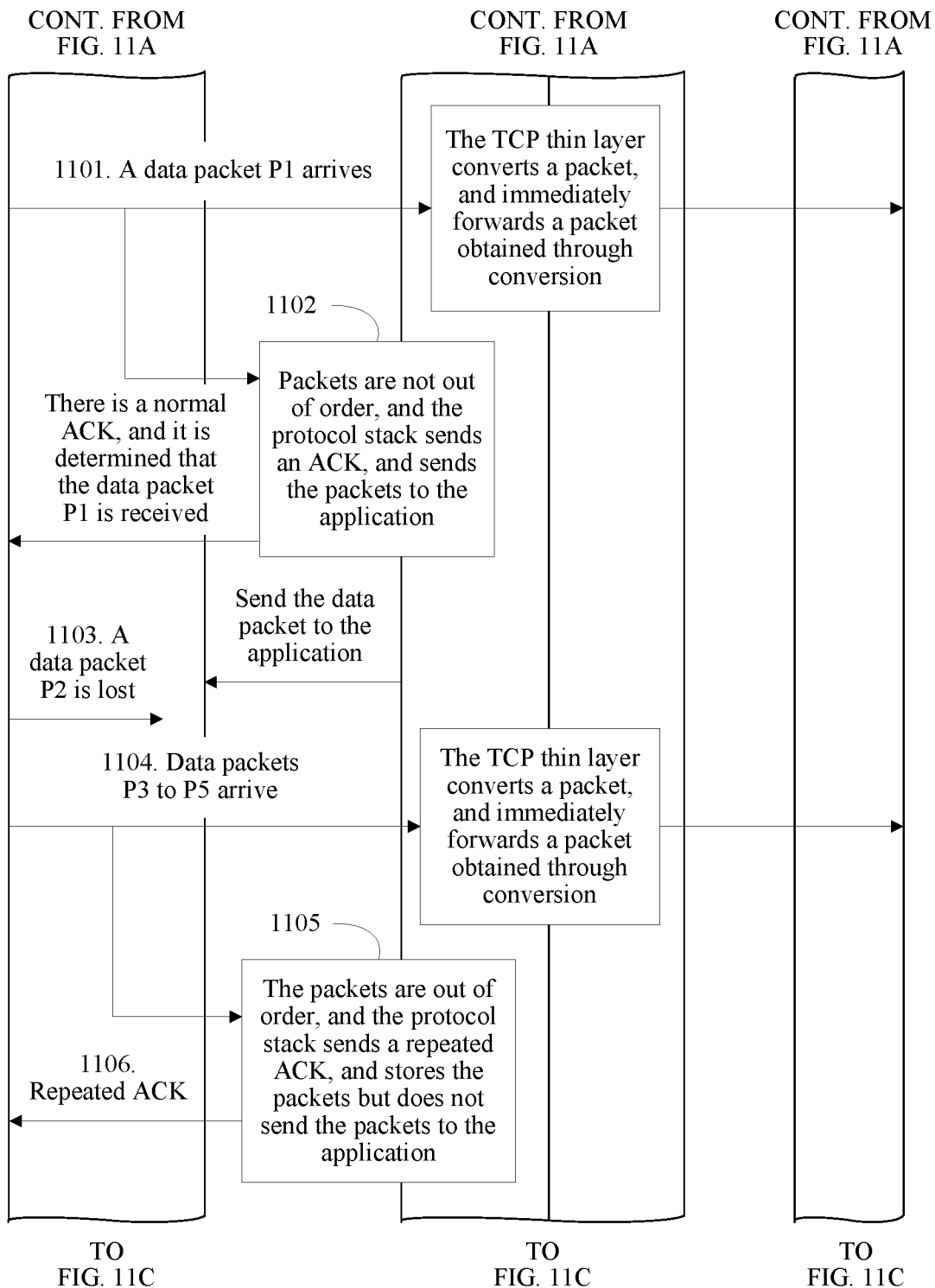
Figure 11C:
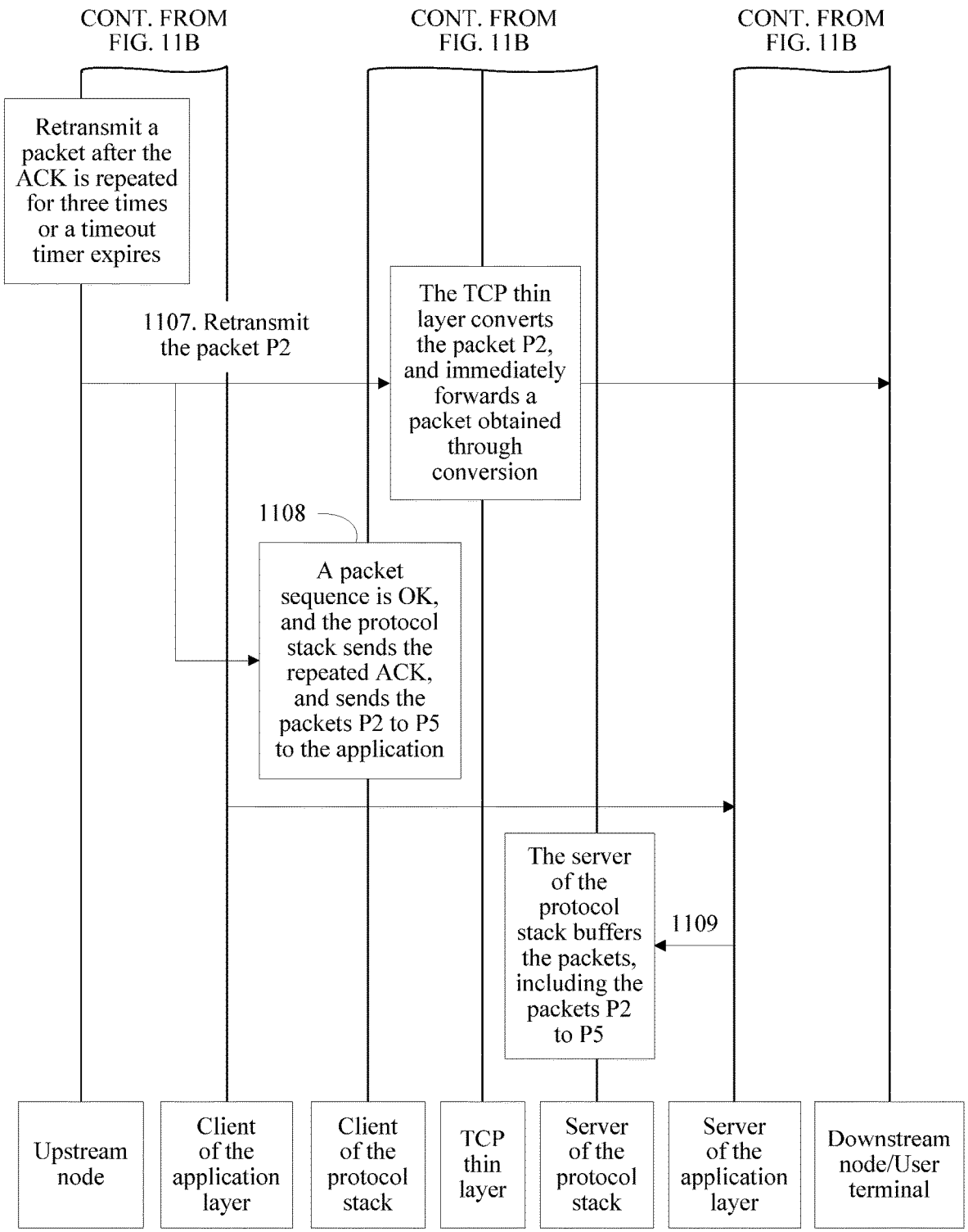

FIG. 11A, FIG. 11B, and FIG. 11C are a flowchart of a data distribution method according to an embodiment of this disclosure. An upstream connection control processing process is mainly provided in this embodiment, including a process of processing a packet loss occurring on an upstream connection. Referring to FIG. 11A, FIG. 11B, and FIG. 11C, a procedure of the method provided in this embodiment of this disclosure includes the following steps.

1101. A data packet P1 sent by an upstream node normally arrives, a distribution server copies the data packet P1 to obtain two data packets, and a TCP thin layer converts one data packet thereof, and then immediately forwards a data packet obtained through conversion to a downstream node or a user terminal.

1102. A protocol stack performs control management on the other data packet obtained through copying, and if the protocol stack checks that there is no out-of-order for the other data packet, the protocol stack sends an ACK to the upstream node to determine that the data packet P1 is received, and sends the other data packet to a client of an application layer.

1103. A data packet P2 sent by the upstream node is lost.

1104. A data packet P3 sent by the upstream node normally arrives, the distribution server copies the data packet P3 to obtain two data packets, and the TCP thin layer converts one data packet thereof, and then immediately forwards a data packet obtained through conversion to the downstream node or the user terminal.

1105. The protocol stack performs control management on the other data packet obtained through copying, and if the protocol stack detects that there is no out-of-order for the other data packet, the protocol stack sends an ACK to the upstream node to determine that the data P1 is received.

It should be noted that, because the data packet P2 is not received, but the data packet P3 is received, the protocol stack determines that the packets are out of order, and still sends the ACK for the data packet P1 to the upstream node. In this case, the ACK is repeated for the first time (the ACK for the data packet P1 has been sent in step 1102).

It should be noted that, because the data packet P2 is lost, a client of the protocol stack stores the data packet P3, and does not send the data packet P3 to the client of the application layer.

1106. Data packets P4 and P5 sent by the upstream node normally arrive, and the TCP thin layer converts the data packets P4 and P5, and then immediately forwards data packets obtained through conversion to the downstream node or the user terminal.

Because the data packets P4 and P5 are further received after the data packet P3, the ACK repeated for the second time and the ACK repeated for the third time for the data packet P1 are further triggered.

1107. After receiving the ACK repeated for three times, the upstream node retransmits the data packet P2, and the TCP thin layer converts the data packet P2, and then immediately forwards a data packet obtained through conversion to the downstream node or the user terminal.

1108. The data packet P2 is sent to the protocol stack, and the protocol stack detects that the data packets are not out of order, sends an ACK to the upstream node to determine that the data packet P5 is received, and sends the data packets P2 to P5 to the client of the application layer.

In another expression manner, after receiving the retransmitted data packet P2, the protocol stack sends an ACK for a last received data packet (namely, the data packet P5) to the upstream node, and sends four data packets: the data packet P2 to the data packet P5 to the client of the application layer.

1109. The client of the application layer forwards the data packets P2 to P5 to a server of the application layer, and the server of the application layer forwards the data packets P2 to P5 to a server of the protocol stack.

The foregoing data packets P2 to P5 are stored in a buffer of the server of the protocol stack in a form of a TCP packet, and deletion of the TCP packet or retransmission of the TCP packet is triggered by an ACK of the downstream node or the user terminal or a timeout of a timeout timer.

It should be noted that, when data forwarding is performed, the data packet P1 may be referred to as a first upstream data packet. For the data packet P1, a downstream data packet forwarded by the distribution server may be referred to as a first downstream data packet, and a data packet buffered in the buffer of the protocol stack may be referred to as a third downstream data packet. The data packet P3 may be referred to as a second upstream data packet. For the data packet P3, a downstream data packet forwarded by the distribution server may be referred to as a second downstream data packet, and a data packet buffered in the buffer of the protocol stack may be referred to as a fifth downstream data packet. The data packet P2 may be referred to as a third upstream data packet. For the data packet P2, a downstream data packet forwarded by the distribution server may be referred to as a fourth downstream data packet, and a data packet buffered in the buffer of the protocol stack may be referred to as a sixth downstream data packet.

In addition, the data packets P1 to P5 are sent by the upstream node in a time sequence, and each data packet corresponds to a sequence number. A sequence number of the first upstream data packet and a sequence number of the second upstream data packet are nonconsecutive. However, the sequence number of the first upstream data packet and a sequence number of the third upstream data packet are consecutive.

In conclusion, how to determine that the upstream data packet is received, and how to process an upstream packet loss, are described in the foregoing implementation process. It should be noted that, in this solution, each time a data packet is received, the data packet is immediately converted and forwarded instead of forwarding a received data packet to an application and then sending the received data packet to the downstream node or the user terminal after a lost packet is received and it is detected that the packets are not out of order.

Figure 12:
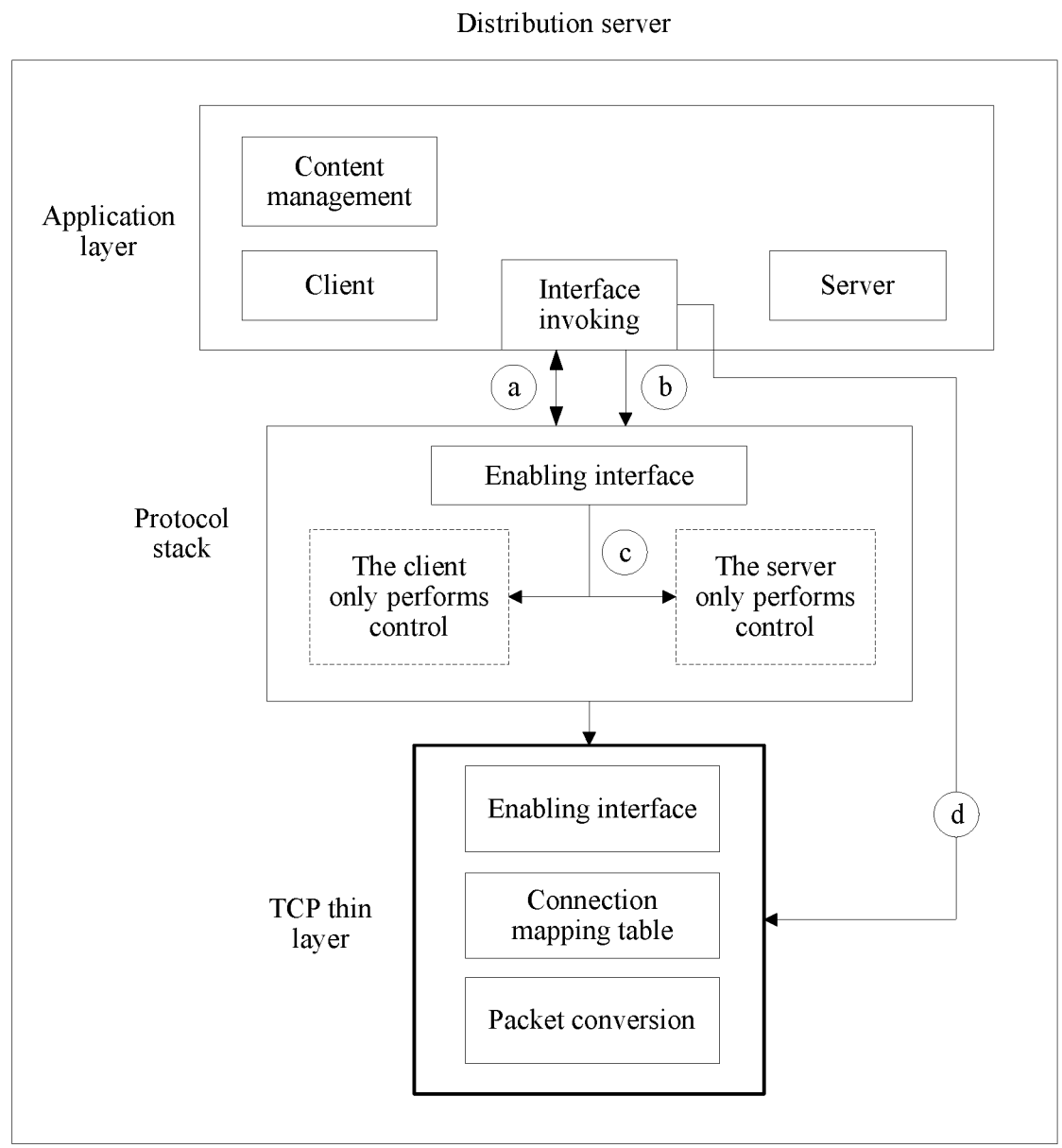
FIG. 12 is a schematic structural diagram of a distribution server according to an embodiment of this disclosure.

In another embodiment, a packet processing procedure in the embodiment shown in FIG. 11A, FIG. 11B, and FIG. 11C is consistent with that in the embodiment shown in FIG. 10A, FIG. 10B, and FIG. 10C. A difference between the two packet processing procedures lies in a process of enabling a low-delay distribution capability. With reference to FIG. 12, the process of enabling the low-delay distribution capability in the embodiment shown in FIG. 11A, FIG. 11B, and FIG. 11C includes the following steps.

(a). The application layer carries an upstream/downstream connection descriptor, invokes a newly added enabling interface of the protocol stack, and obtains upstream/downstream connection information, for example, including at least an initial sequence number of an uplink/downlink connection.

The newly added enabling interface of the protocol stack is, for example, in the following form: int getsockopt(int sockfd, int level, int optname, void *optval, socklen_t*optlen), where "optname" carries identification information indicating that the upstream/downstream connection information needs to be obtained, where for example, a value of "optname" may be TCP_CONNECTINFO; and "optval" includes two structures with a structure type of "connectinfo", where during invoking, each "connectinfo" carries an upstream/downstream connection identifier indicating that control management and data forwarding need to be separated, for example, an upstream/downstream connection descriptor "fd_client or fd_server", where "connectinfo" is as follows:

```
struct connectinfo {
    int socketfd; //connection descriptor
    struct ipports; //N-tuple information of a connection
    int seqinit; //initial sequence number of a connection
}
```

It should be noted that, when ending invoking, the protocol stack adds, to "seqinit", an initial sequence number of a connection specified by "socketfd", and adds N-tuple information of the connection to "ipports". However, the N-tuple information is not necessary because the application layer can learn of the N-tuple information without invoking the interface.

(b). The application layer carries the upstream/downstream connection identifier, invokes another newly added enabling interface of the protocol stack, and instructs the protocol stack to separate a data forwarding function and a control management function.

The newly added enabling interface may be in a setsockopt API form, for example, int setsockopt(int sockfd, int level, int optname,const void *optval, socklen_t optlen), where "optval" carries the upstream/downstream connection identifier indicating that control management and data forwarding need to be separated, and "optname" carries the enabling flag for instructing to separate data distribution and control management, and represents low-delay distribution. For example, a value of "optname" may be TCP_ZERODELAY, where TCP_ZERODELAY represents forwarding without waiting.

(c). After being invoked by the application layer, the protocol stack separates the data forwarding function and the control management function of an upstream/downstream connection.

During separation, a data forwarding function and a control management function of a TCP connection corresponding to "fd_server" are specifically separated, to be specific, a data packet is received after the action is performed, the data packet is only encapsulated into a TCP packet but is not sent, and control management is triggered by a timeout or an ACK; or a data forwarding function and a control management function of a TCP connection corresponding to "fd_client" are specifically separated, to be specific, a data packet is received after the action is performed, the data packet is only encapsulated into a TCP packet but is not sent, and control management is triggered by a timeout or an ACK.

(d). The application layer carries N-tuple information and an initial sequence number of the upstream/downstream connection, invokes an enabling interface of the TCP thin layer, establishes a connection mapping table, and enables a low-delay distribution function of the TCP thin layer.

The enabling interface of the TCP thin layer is, for example, in the following form:

int settcpmap(const void *client_conn_info, void *server_conn_info, bool enable), where "client_conn_info" carries upstream connection information, and may include N-tuple information (for example, a source IP/port and a destination IP/port) and an initial sequence number; and "server_conn_info" carries downstream connection information, and may include N-tuple information (for example, a source IP/port and a destination IP/port) and an initial sequence number. For "enable", "true" indicates that the connection mapping table is established, and "false" indicates that the connection mapping table is deleted.

It should be noted that the TCP thin layer needs to establish two connection mapping tables, where one represents that data is sent from upstream to downstream, and the other represents that data is sent from downstream to upstream. Implementation methods of the two connection mapping tables are the same. In this embodiment of this disclosure, only an example in which the data is sent from the upstream to the downstream is used for description. For this scenario, the connection mapping table is, for example, in the following form.

| Src | dst | seq_diff |
|---|---|---|
| N-tuple information of an upstream connection | N-tuple information of a downstream connection | Difference between initial sequence numbers of an upstream connection and a downstream connection |

It is assumed that N-tuple information is four-tuple information. The four-tuple information of the upstream connection is (IPup, Portup, IPc, and Portc), and the initial sequence number of the upstream connection is "Sequpinit". The four-tuple information of the downstream connection is (IPs, Ports, IPdown, and Portdown), and the initial sequence number of the downstream connection is "Seqdowninit".

"IPup" and "Portup" represent a sensing address and a port of the upstream node, "IPc" and "Portc" represent an address and a port that are used when the distribution server initiates the upstream connection, "IPs" and "Ports" represent a sensing address and a port of the distribution server, and "IPdown" and "Portdown" represent an address and a port that are used when the downstream node initiates the downstream connection. When the data is sent from upstream to downstream, the corresponding connection mapping table is as follows.

| Src | dst | seq_diff |
|---|---|---|
| IPup, Portup, IPc, Portc | IPs, Ports, IPdown, Portdown | Seqdowninit-Sequpinit |

In the foregoing two tables, "Src" is used as an index, to be specific, when receiving an upstream data packet, the TCP thin layer extracts N-tuple information of the upstream data packet, and compares the N-tuple information of the upstream data packet with "Src" in the connection mapping table. When same "Src" occurs, mapping conversion, in other words, conversion is performed by using the mapping entries "dst" and "seq_diff". It should be noted that a common hash method and the like may be further used herein to store the mapping entries and accelerate an indexing process. This is not specifically limited in this embodiment of this disclosure.

It should be noted that a difference between the embodiment corresponding to FIG. 11A, FIG. 11B, and FIG. 11C and the embodiment corresponding to FIG. 10A, FIG. 10B, and FIG. 10C lies in the following.

In the embodiment corresponding to FIG. 10A, FIG. 10B, and FIG. 10C, only one enabling interface is added to the protocol stack. The application layer invokes the enabling interface once, to instruct the protocol stack to enable the low-delay capability, so that the protocol stack separates control management and data forwarding of the protocol stack, and invokes the enabling interface of the TCP thin layer, to instruct the TCP thin layer to establish the connection mapping table and enable the low-delay distribution capability.

In the embodiment corresponding to FIG. 11A, FIG. 11B, and FIG. 11C, two enabling interfaces are newly added to the protocol stack. The application layer invokes one of the two enabling interfaces to obtain the upstream/downstream connection information, invokes the other one of the two enabling interfaces to instruct the protocol stack to perform separation, and invokes the enabling interface of the TCP thin layer to instruct the TCP thin layer to establish the connection mapping table and enable the low-delay distribution capability.

According to the method provided in this embodiment of this disclosure, for at least two continuously received upstream data packets, regardless of whether sequence numbers of the packets are consecutive, the distribution server copies each upstream data packet to obtain two packets, where data forwarding is immediately performed on one packet, and control management is performed on the other packet. In this embodiment of this disclosure, the data distribution process and the control management process are separated, and there is no need to distribute a data packet after control management is performed on the data packet, so as to greatly shorten a path for forwarding the data packet. In addition, regardless of whether a packet loss occurs, a packet is immediately forwarded after the packet is received, so as to greatly shorten a data distribution delay. The TCP thin layer dedicated to converting and sending a data packet is added to the distribution server, the low-delay distribution capability of the TCP thin layer is enabled, the data forwarding function of the protocol stack is excluded, and only the control management function of the protocol stack is retained, so that the control management function and the data forwarding function of the protocol stack are separated, and impact imposed by the control management process on the data forwarding process is reduced. Therefore, the TCP thin layer can immediately convert and send a received data packet, so as to shorten a path for forwarding the data packet, and greatly shorten a delay.

Figure 13A:
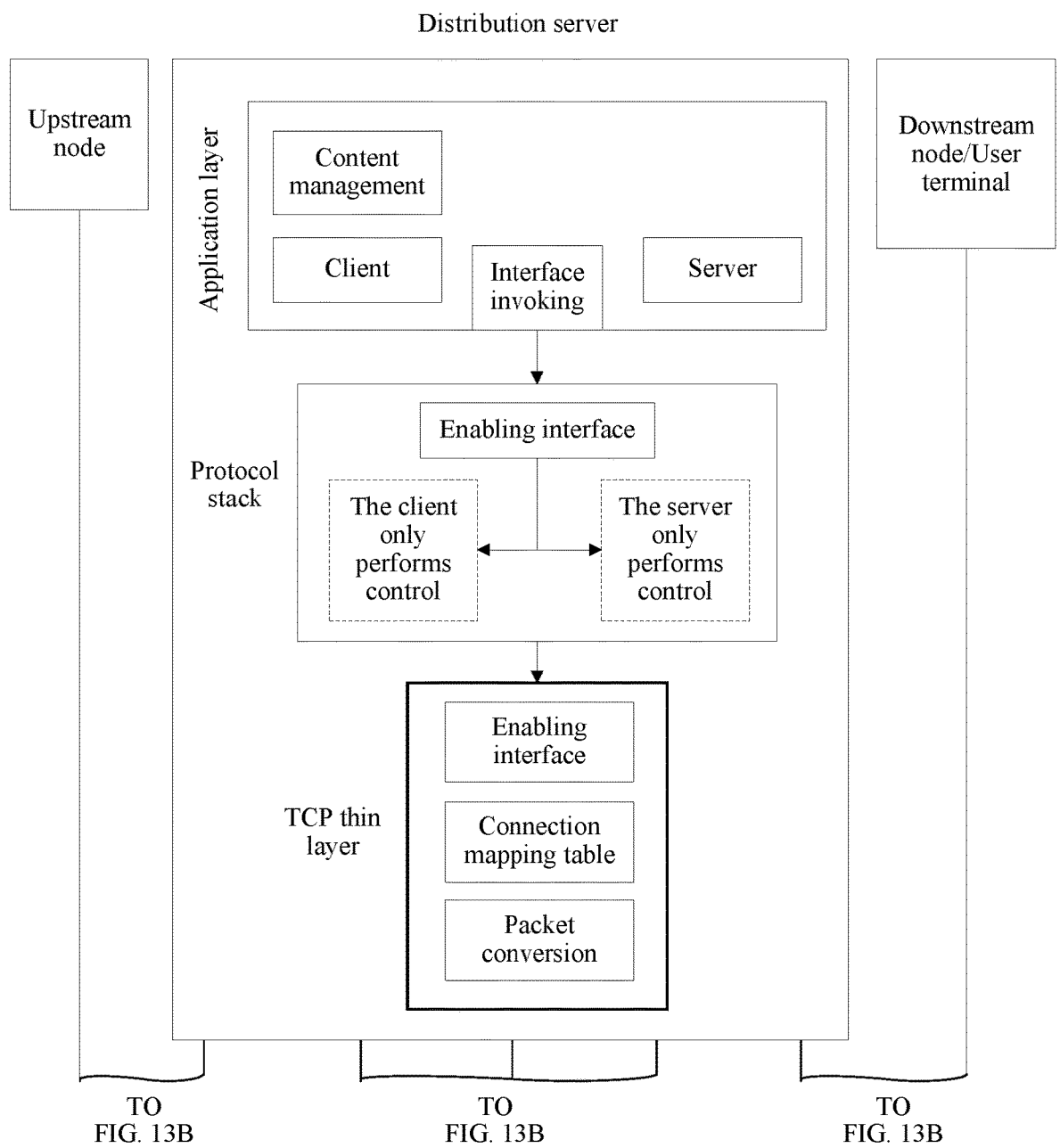
FIG. 13A, FIG. 13B, and FIG. 13C are a flowchart of a third data distribution method according to an embodiment of this disclosure.
Figure 13B:
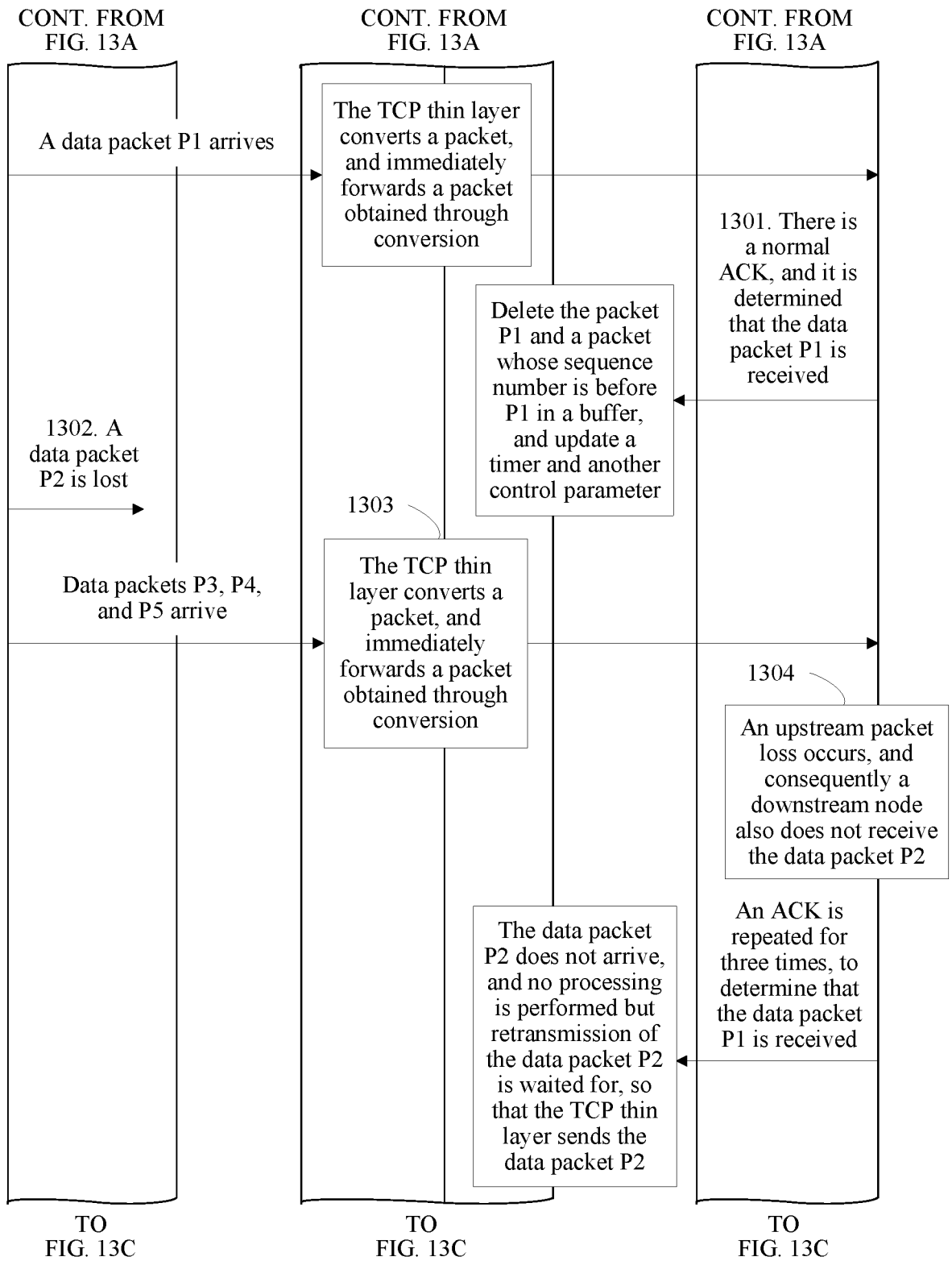
Figure 13C:
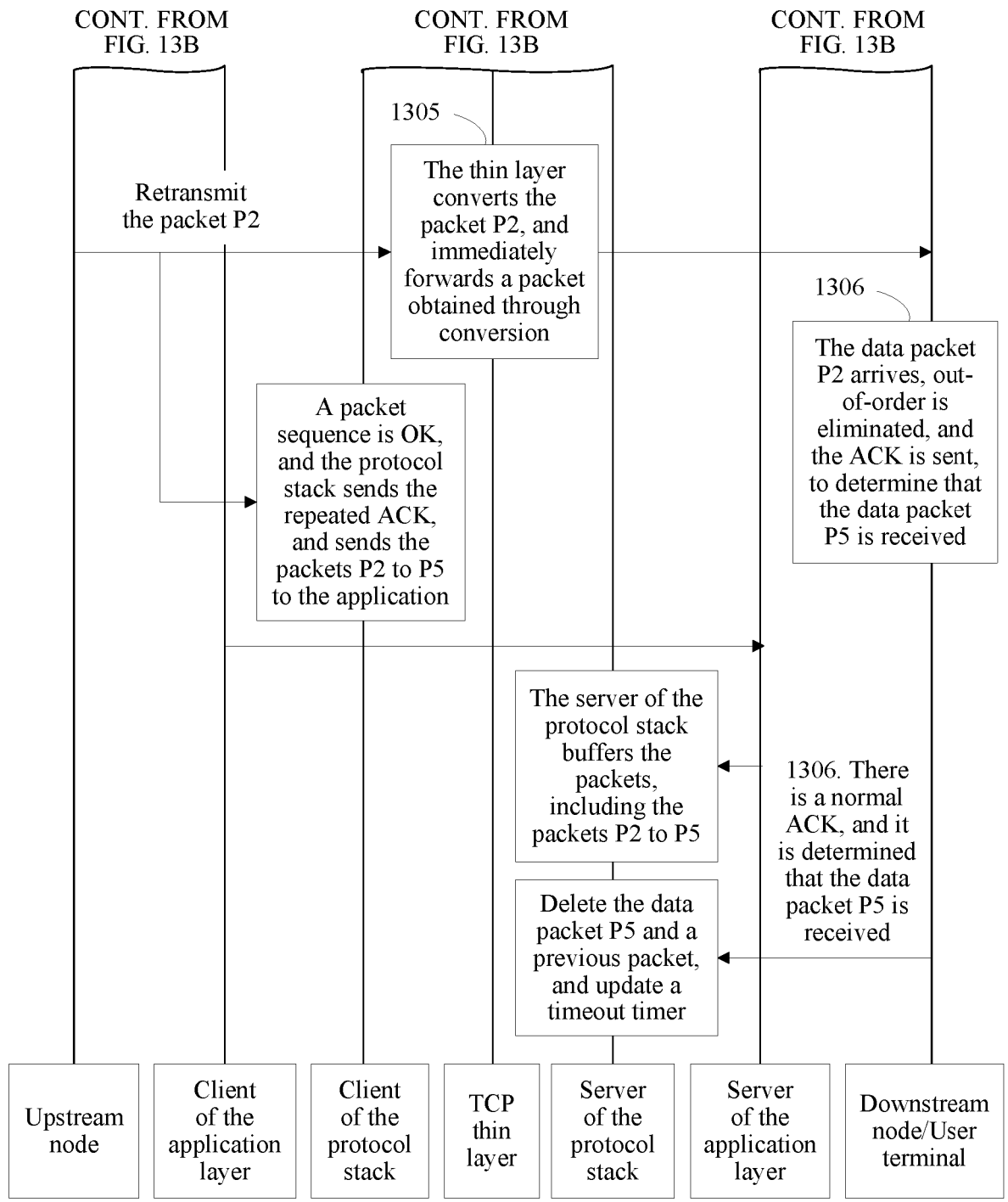

FIG. 13A, FIG. 13B, and FIG. 13C are a flowchart of a data distribution method according to an embodiment of this disclosure. A downstream control processing process is mainly provided in this embodiment, including a process of processing a packet loss occurring on a downstream connection that is caused by a packet loss occurring in an upstream connection. Referring to FIG. 13A, FIG. 13B, and FIG. 13C, a procedure of the method provided in this embodiment of this disclosure includes the following steps.

1301. After sequentially receiving a data packet P1, a downstream node or a user terminal sends an ACK to a distribution server.

This step is for a process of processing a downstream ACK when no packet loss occurs. After sequentially receiving the data packet P1, the downstream node or the user terminal sends the ACK to the distribution server, to determine that the data packet P1 is received. The distribution server sends the received ACK to a protocol stack. The protocol stack deletes the data packet P1 in a buffer and another data packet whose sequence number is before P1, and updates a timeout timer and another control parameter. This is not specifically limited in this embodiment of this disclosure.

1302. A data packet P2 sent by an upstream node is lost.

1303. Data packets P3 to P5 sent by the upstream node arrive, and a TCP thin layer converts the data packets P3 to P5, and then immediately forwards data packets obtained through conversion to the downstream node or the user terminal.

1304. The downstream node or the user terminal does not receive the data packet P2.

For this step, because an upstream packet loss occurs, and the TCP thin layer does not receive the data packet P2, the downstream node or the user terminal also does not receive the data packet P2. When sequentially receiving the data packets P3 to P5, the downstream node or the user terminal triggers sending of the ACK repeated for three times for the data packet P to the distribution server, to merely determine that the data packet P1 is received, and indicate that the data packet P2 is lost.

After the distribution server receives the ACK repeated for three times, because the buffer does not store the data packet P2 currently, the distribution server cannot implement retransmission, and therefore does not perform any processing but waits for the TCP thin layer to receive the data packet P2 retransmitted by the upstream node and forward the data packet P2 to the downstream node or the user terminal.

1305. After receiving the ACK repeated for three times, the upstream node retransmits the data packet P2, and copies the data packet P2 to obtain two data packets, and the TCP thin layer converts one data packet thereof into a downstream data packet, and then immediately forwards the downstream data packet to the downstream node or the user terminal.

Because the distribution server sequentially receives the data packets P3 to P5 after receiving the data packet P1, the distribution server sends the ACK repeated for three times for the data packet P1 to the upstream node, to trigger the upstream node to retransmit the data packet P2.

1306. After receiving the data packet P2, the downstream node or the user terminal eliminates out-of-order, and sends an ACK to the distribution server, to determine that the data packet P5 is received. After the distribution server receives the ACK, the protocol stack deletes the stored data packet P5 and a data packet whose sequence number is before P5, and updates the timeout timer and another control parameter.

It should be first noted that for step 1304, if the ACK sent by the downstream node or the user terminal arrives later, to be specific, the ACK arrives after the distribution server has received the data packet P2 retransmitted by the upstream node, the distribution server may re-trigger retransmission of the data packet P2. Because the TCP thin layer has forwarded the data packet P2 once, the downstream node or the user terminal receives two data packets P2, and the downstream node or the user terminal automatically discards the second data packet P2 when receiving the second data packet P2, which imposes no impact on a service.

It should be second noted that, when the downstream packet loss is caused by the upstream packet loss, if the node receives the repeated ACK of the downstream node or the user terminal before receiving the data packet retransmitted by the upstream node, the node possibly cannot implement retransmission, and needs to wait for the data packet retransmitted by the upstream node to arrive. The TCP thin layer directly forwards the data packet.

It should be third noted that the case in which the downstream packet loss is caused by the upstream packet loss is described above. For the case in which the packet loss occurs on the downstream connection, a server of the protocol stack is responsible for retransmission. A specific flowchart is not described herein. In addition, if the downstream packet loss is severe, for example, a high packet loss rate is caused by quite poor link quality, or a packet loss occurs on a node because of quite poor processing performance of the downstream node, it indicates that performance of the downstream link or the downstream node cannot meet a requirement of a currently transmitted data amount. In this case, the downstream node may be triggered to re-initiate a request, to request content with a small data amount (for example, to switch a video from high definition to standard definition), or the distribution server may be triggered to establish a new connection mapping table and provide a service for the slow node based on the newly established connection mapping table.

In another embodiment, the connection mapping table described in the foregoing embodiment is only for a case in which one upstream connection corresponds to one downstream connection. However, in an actual application scenario, especially in a live broadcast scenario, a plurality of downstream nodes may initiate a plurality of connections to the node (the distribution server), to request same content. In this case, the node needs to initiate only one upstream connection. In this case, one upstream connection is mapped to a plurality of downstream connections. A processing process is as follows.

When receiving a request for the first time, the node triggers establishment of the connection mapping table based on the processing in the embodiment corresponding to FIG. 10A, FIG. 10B, and FIG. 10C. The connection mapping table is as follows.

| Src | dst | seq_diff |
|---|---|---|
| IPup, Portup, IPc, Portc | IPs, Ports, IPdown1, Portdown1 | Seqdowninit1-Sequpinit |

When receiving a request for the $N^{th}$ (N>1) time, the node does not trigger an upstream request, but still triggers establishment of the connection mapping table based on the processing in the embodiment corresponding to FIG. 10A, FIG. 10B, and FIG. 10C. In this case, the connection mapping table is as follows.

| Src | dst | seq_diff |
|---|---|---|
| IPup, Portup, IPc, Portc | IPs, Ports, IPdown1, Portdown1 IPs, Ports, IPdownN, PortdownN | Seqdowninit1-Sequpinit SeqdowninitN-Sequpinit |

In this way, after receiving the data packet sent by the upstream node, the TCP thin layer queries the established connection mapping table. If a found target mapping entry includes N "dst" options, the TCP thin layer converts the received data for N times, and each conversion process is similar to that in the embodiment corresponding to FIG. 10A, FIG. 10B, and FIG. 10C. However, each conversion is performed based on a "dst" option and a "seq_diff" option, and sending is performed each time the conversion is completed.

Because the processing process in which one upstream connection is mapped to a plurality of downstream connections in the TCP thin layer is added, the TCP thin layer may better support a live broadcast scenario and the like. Because there may be an out-of-sync problem of live broadcast joining, and some Internet users may join later, the application layer may send buffered data obtained through screening to the later-joining Internet user. After the later-joining Internet user is synchronized with an earlier-joining Internet user, the application layer adds downstream connection information of the later-joining Internet user to the foregoing connection mapping table. Then, the TCP thin layer performs data forwarding in the manner described above, to implement data synchronization. Alternatively, a common buffer may be set for a live broadcast object in the TCP thin layer or the protocol stack, and the buffer is used to buffer buffered data of the live broadcast object. When an Internet user joins later, the TCP thin layer or the protocol stack may send buffered data obtained through screening to the later-joining Internet user. Similarly, after the later-joining Internet user is synchronized with an earlier-joining Internet user, the TCP thin layer performs data forwarding in the manner described above, to implement data synchronization.

It should be noted that for the case in which one upstream connection is mapped to a plurality of downstream connections, a live broadcast scenario is used as an example. After the protocol stack encapsulates the received upstream data packet into a TCP packet and buffers the TCP packet in the buffer, to help the later-joining Internet user to watch the live broadcast, the protocol stack does not delete the buffered data in the buffer even if receiving an ACK packet returned by the downstream node or the Internet user.

According to the method provided in this embodiment of this disclosure, for at least two continuously received upstream data packets, regardless of whether sequence numbers of the packets are consecutive, the distribution server copies each upstream data packet to obtain two packets, where data forwarding is immediately performed on one packet, and control management is performed on the other packet. In this embodiment of this disclosure, the data distribution process and the control management process are separated, and there is no need to distribute a data packet after control management is performed on the data packet, so as to greatly shorten a path for forwarding the data packet. In addition, regardless of whether a packet loss occurs, a packet is immediately forwarded after the packet is received, so as to greatly shorten a data distribution delay.

The TCP thin layer dedicated to converting and sending a data packet is added to the distribution server, the low-delay distribution capability of the TCP thin layer is enabled, the data forwarding function of the protocol stack is excluded, and only the control management function of the protocol stack is retained, so that the control management function and the data forwarding function of the protocol stack are separated, and impact imposed by the control management process on the data forwarding process is reduced. Therefore, the TCP thin layer can immediately convert and send a received data packet, so as to shorten a path for forwarding the data packet, and greatly shorten a delay.

Figure 14:
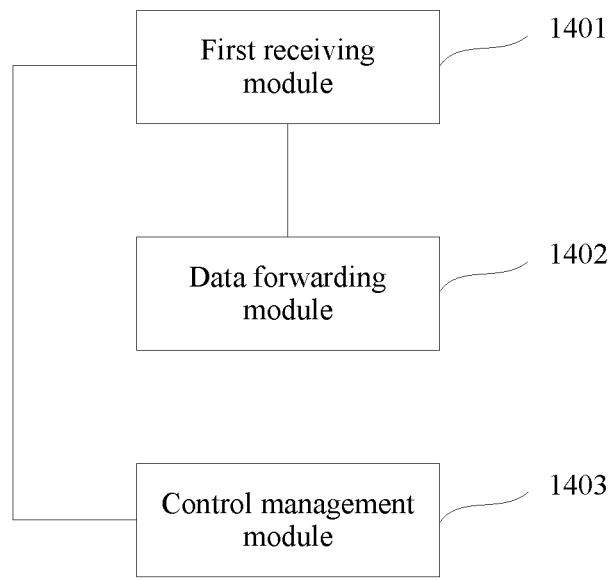
FIG. 14 is a schematic structural diagram of a distribution server according to an embodiment of this disclosure.

FIG. 14 is a schematic structural diagram of a distribution server according to an embodiment of this disclosure. Referring to FIG. 14, the server includes a first receiving module 1401, a data forwarding module 1402, and a control management module 1403. The data forwarding module 1402 is configured to implement the data forwarding function of the foregoing TCP thin layer. The control management module 1403 is configured to implement the control management function of the protocol stack. The first receiving module 1401 may correspond to the buffer that receives the data packet sent by the upstream node in FIG. 8A and FIG. 8B.

The first receiving module 1401 is configured to: continuously receive a first upstream data packet and a second upstream data packet that are sent by an upstream node, and copy the first upstream data packet and copy the second upstream data packet.

The data forwarding module 1402 is configured to: convert, based on an established connection mapping table, a first packet in two packets obtained by copying the first upstream data packet, and send a first downstream data packet obtained through conversion to a downstream node or a user terminal.

The control management module 1403 is configured to perform control management on a second packet obtained by copying the first upstream data packet.

The data forwarding module 1402 is further configured to: convert, based on the connection mapping table, a first packet in two packets obtained by copying the second upstream data packet, and send a second downstream data packet obtained through conversion to the downstream node or the user terminal.

The control management module 1403 is further configured to perform control management on a second packet obtained by copying the second upstream data packet.

The connection mapping table provides a mapping relationship between upstream connection information and downstream connection information.

According to the distribution server provided in this embodiment of this disclosure, for at least two continuously received upstream data packets, regardless of whether sequence numbers of the packets are consecutive, the distribution server copies each upstream data packet to obtain two packets, where data forwarding is immediately performed on one packet, and control management is performed on the other packet. In this embodiment of this disclosure, the data distribution process and the control management process are separated, and there is no need to distribute a data packet after control management is performed on the data packet, so as to greatly shorten a path for forwarding the data packet. In addition, regardless of whether a packet loss occurs, a packet is immediately forwarded after the packet is received, so as to greatly shorten a data distribution delay.

In another embodiment, a sequence number of the first upstream data packet and a sequence number of the second upstream data packet are nonconsecutive, and the first upstream data packet is received before the second upstream data packet.

In another embodiment, the connection mapping table includes a plurality of mapping entries, each mapping entry provides N-tuple information of an upstream connection, N-tuple information of a downstream connection that matches the N-tuple information of the upstream connection, and a difference between initial sequence numbers of the upstream connection and the downstream connection.

The data forwarding module 1402 is further configured to: obtain N-tuple information in the first packet; query the connection mapping table based on the N-tuple information in the first packet, to obtain a target mapping entry matching the N-tuple information in the first packet; and replace the N-tuple information in the first packet with N-tuple information of a target downstream connection included in the target mapping entry, and calculate a sequence number of the target downstream connection based on a difference between target initial sequence numbers included in the target mapping entry and a sequence number carried in the first packet.

In another embodiment, the control management module 1403 is further configured to: perform an out-of-order check on the second packet obtained by copying the first upstream data packet, and send an acknowledgment ACK packet for the first upstream data packet to the upstream node.

In another embodiment, the control management module 1403 is further configured to: convert the second packet obtained by copying the first upstream data packet into a third downstream data packet; store the third downstream data packet in a buffer, and set a timeout timer; and when the timeout timer expires, send the third downstream data packet to the downstream node or the user terminal.

In another embodiment, one piece of upstream connection information corresponds to one piece of downstream connection information in the connection mapping table; and the control management module 1403 is further configured to: when the ACK packet returned by the downstream node or the user terminal is received before the timeout timer expires, delete the third downstream data packet stored in the buffer.

In another embodiment, the first receiving module 1401 is further configured to: receive a third upstream data packet retransmitted by the upstream node, and copy the third upstream data packet, where a sequence number of the third upstream data packet and the sequence number of the first upstream data packet are consecutive.

The data forwarding module 1402 is further configured to: convert, based on the connection mapping table, a first packet in two packets obtained through copying, send a fourth downstream data packet obtained through conversion to the downstream node or the user terminal, and perform control management on a second packet obtained by copying the third upstream data packet.

In another embodiment, the control management module 1403 is further configured to: perform an out-of-order check on the second packet obtained by copying the second upstream data packet, and send an ACK packet for the first upstream data packet to the upstream node.

In another embodiment, the control management module 1403 is further configured to: after the data forwarding module 1402 sends a fourth downstream data packet to the downstream node or the user terminal, convert the second packet obtained by copying the second upstream data packet into a fifth downstream data packet; store the fifth downstream data packet in a buffer, and set a timeout timer; and when the timeout timer expires, send the fifth downstream data packet to the downstream node or the user terminal.

In another embodiment, one piece of upstream connection information corresponds to one piece of downstream connection information in the connection mapping table; and the control management module 1403 is further configured to: when the ACK packet returned by the downstream node or the user terminal is received before the timeout timer expires, delete the fifth downstream data packet stored in the buffer.

In another embodiment, the control management module 1403 is further configured to: if a second receiving module receives, before the first receiving module 1401 receives the third upstream data packet retransmitted by the upstream node, an ACK repeated for M times that is sent by the downstream node or the user terminal, wait for the upstream node to retransmit the third upstream data packet, where the ACK repeated for M times is for the first upstream data packet.

The data forwarding module 1402 is further configured to: after the retransmitted third upstream data packet is received, perform the steps of converting, based on the connection mapping table, a first packet in two packets obtained by copying the third upstream data packet, and sending a fourth downstream data packet obtained through conversion to the downstream node or the user terminal.

In another embodiment, the control management module 1403 is further configured to: if a second receiving module receives, after the first receiving module 1401 receives the third upstream data packet retransmitted by the upstream node, an ACK repeated for M times that is sent by the downstream node or the user terminal, send, to the downstream node or the user terminal, a sixth downstream data packet that is stored in a buffer and that matches the third upstream data packet.

Any one of the foregoing optional manners and the embodiments of this disclosure may be combined to constitute optional embodiments of this disclosure.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely alternative embodiments of this disclosure, but are not intended to limit this disclosure. Any modification, equivalent replacement, or improvement made without departing from the spirit and principle of this disclosure should fall within the protection scope of this disclosure.

What is claimed is:
1. A method, comprising:
continuously receiving, by a distribution server, a first upstream data packet and a second upstream data packet that are sent by an upstream node;
copying, by the distribution server, the first upstream data packet to obtain two packets;
converting, by the distribution server based on a connection mapping table, a first packet in the two packets obtained by copying the first upstream data packet, to obtain a first downstream data packet;
sending, by the distribution server, the first downstream data packet obtained through conversion to a downstream node or a user terminal;
performing, by the distribution server, control management on a second packet in the two packets obtained by copying the first upstream data packet; and
copying, by the distribution server, the second upstream data packet to obtain another two packets;
converting, based on the connection mapping table, a first packet in the another two packets obtained by copying the second upstream data packet, to obtain a second downstream data packet;
sending, by the distribution server, the second downstream data packet obtained through conversion to the downstream node or the user terminal; and performing, by the distribution server, control management on a second packet in the another two packets obtained by copying the second upstream data packet; and wherein the connection mapping table provides a mapping relationship between upstream connection information and downstream connection information.

2. The method according to claim 1, wherein a sequence number of the first upstream data packet and a sequence number of the second upstream data packet are nonconsecutive, and the first upstream data packet is received before the second upstream data packet.

3. The method according to claim 2, wherein performing control management on the second packet of the another two packets obtained by copying the second upstream data packet comprises:
performing an out-of-order check on the second packet of the another two packets obtained by copying the second upstream data packet, and sending an acknowledgment (ACK) packet for the first upstream data packet to the upstream node.

4. The method according to claim 3, further comprising:
after a fourth downstream data packet is sent to the downstream node or the user terminal, converting the second packet of the another two packets obtained by copying the second upstream data packet into a fifth downstream data packet;
storing the fifth downstream data packet in a buffer, and setting a timeout timer; and
when the timeout timer expires, sending the fifth downstream data packet to the downstream node or the user terminal.

5. The method according to claim 4, wherein one piece of upstream connection information corresponds to one piece of downstream connection information in the connection mapping table, and the method further comprises:
when the ACK packet returned by the downstream node or the user terminal is received before the timeout timer expires, deleting the fifth downstream data packet stored in the buffer.

6. The method according to claim 1, wherein:
the connection mapping table comprises a plurality of mapping entries, each mapping entry of the plurality of mapping entries provides N-tuple information of a respective upstream connection, N-tuple information of a downstream connection that matches the N-tuple information of the respective upstream connection, and a difference between initial sequence numbers of the respective upstream connection and the downstream connection that matches the N-tuple information of the respective upstream connection; and
converting the first packet in the two packets obtained by copying the first upstream data packet comprises:
obtaining N-tuple information in the first packet in the two packets obtained by copying the first upstream data packet;
querying the connection mapping table based on the N-tuple information in the first packet in the two packets obtained by copying the first upstream data packet, to obtain a target mapping entry matching the N-tuple information in the first packet in the two packets obtained by copying the first upstream data packet;
replacing the N-tuple information in the first packet in the two packets obtained by copying the first upstream data packet with N-tuple information of a target downstream connection comprised in the target mapping entry; and
calculating a sequence number of the target downstream connection based on a difference between target initial sequence numbers comprised in the target mapping entry and a sequence number carried in the first packet in the two packets obtained by copying the first upstream data packet.

7. The method according to claim 1, wherein performing control management on the second packet in the two packets obtained by copying the first upstream data packet comprises:
performing an out-of-order check on the second packet in the two packets obtained by copying the first upstream data packet; and
sending an acknowledgment (ACK) packet for the first upstream data packet to the upstream node.

8. The method according to claim 7, further comprising:
converting the second packet in the two packets obtained by copying the first upstream data packet into a third downstream data packet;
storing the third downstream data packet in a buffer, and setting a timeout timer; and
when the timeout timer expires, sending the third downstream data packet to the downstream node or the user terminal.

9. The method according to claim 8, wherein one piece of upstream connection information corresponds to one piece of downstream connection information in the connection mapping table, and the method further comprises:
when the ACK packet returned by the downstream node or the user terminal is received before the timeout timer expires, deleting the third downstream data packet stored in the buffer.

10. The method according to claim 1, further comprising:
receiving a third upstream data packet retransmitted by the upstream node, wherein a sequence number of the third upstream data packet and the sequence number of the first upstream data packet are consecutive;
copying the third upstream data packet, to obtain additional two packets;
converting, based on the connection mapping table, a first packet in the additional two packets obtained by copying the third upstream data packet, to obtain a fourth downstream data packet;
sending the fourth downstream data packet obtained through conversion to the downstream node or the user terminal; and
performing control management on a second packet of the additional two packets obtained by copying the third upstream data packet.

11. A server, comprising:
a receiver, configured to continuously receive a first upstream data packet and a second upstream data packet that are sent by an upstream node;
a processor; and
a non-transitory computer-readable storage medium storing a program to be executed by the processor, the program including instructions for:
copying the first upstream data packet, to obtain two packets;
copying the second upstream data packet, to obtain another two packets;

converting, based on a connection mapping table, a first packet in the two packets obtained by copying the first upstream data packet, to obtain a first downstream data packet;

sending the first downstream data packet obtained through conversion to a downstream node or a user terminal;

performing control management on a second packet in the two packets obtained by copying the first upstream data packet;

converting, based on the connection mapping table, a first packet in the another two packets obtained by copying the second upstream data packet, to obtain a second downstream data packet;

sending the second downstream data packet obtained through conversion to the downstream node or the user terminal; and performing control management on a second packet in the another two packets obtained by copying the second upstream data packet; and wherein the connection mapping table provides a mapping relationship between upstream connection information and downstream connection information.

12. The server according to claim 11, wherein a sequence number of the first upstream data packet and a sequence number of the second upstream data packet are nonconsecutive, and the first upstream data packet is received before the second upstream data packet.

13. The server according to claim 12, wherein the program further includes instructions for:

performing an out-of-order check on the second packet in the two packets obtained by copying the first upstream data packet; and sending an acknowledgment (ACK) packet for the first upstream data packet to the upstream node.

14. The server according to claim 11, wherein:

the connection mapping table comprises a plurality of mapping entries, each mapping entry of the plurality of mapping entries provides N-tuple information of a respective upstream connection, N-tuple information of a downstream connection that matches the N-tuple information of the respective upstream connection, and a difference between initial sequence numbers of the respective upstream connection and the downstream connection that matches the N-tuple information of the respective upstream connection; and the program further includes instructions for:

obtaining N-tuple information in the first packet in the two packets obtained by copying the first upstream data packet;

querying the connection mapping table based on the N-tuple information in the first packet in the two packets obtained by copying the first upstream data packet, to obtain a target mapping entry matching the N-tuple information in the first packet in the two packets obtained by copying the first upstream data packet;

replace the N-tuple information in the first packet in the two packets obtained by copying the first upstream data packet with N-tuple information of a target downstream connection comprised in the target mapping entry; and calculating a sequence number of the target downstream connection based on a difference between target initial sequence numbers comprised in the target mapping entry and a sequence number carried in the first packet in the two packets obtained by copying the first upstream data packet.

15. The server according to claim 11, wherein the program further includes instructions for:

performing an out-of-order check on the second packet in the two packets obtained by copying the first upstream data packet; and sending an acknowledgment (ACK) packet for the first upstream data packet to the upstream node.

16. The server according to claim 15, wherein the program further includes instructions for:

converting the second packet in the two packets obtained by copying the first upstream data packet into a third downstream data packet;

storing the third downstream data packet in a buffer, and setting a timeout timer; and when the timeout timer expires, sending the third downstream data packet to the downstream node or the user terminal.

17. The server according to claim 16, wherein:

one piece of upstream connection information corresponds to one piece of downstream connection information in the connection mapping table; and the program further includes instructions for:

when the ACK packet returned by the downstream node or the user terminal is received before the timeout timer expires, delete the third downstream data packet stored in the buffer.

18. The server according to claim 11, wherein:

the receiver is further configured to receive a third upstream data packet retransmitted by the upstream node; and the program further includes instructions for:

copying the third upstream data packet to obtain an additional two packets, wherein a sequence number of the third upstream data packet and the sequence number of the first upstream data packet are consecutive;

converting, based on the connection mapping table, a first packet in the additional two packets obtained through copying;

sending a fourth downstream data packet obtained through conversion to the downstream node or the user terminal; and performing control management on a second packet of the additional two packets obtained by copying the third upstream data packet.

19. The server according to claim 18, wherein the program further includes instructions for:

before the receiver receives the third upstream data packet retransmitted by the upstream node, and in response to the receiver receiving an acknowledgment (ACK) repeated for M times that is sent by the downstream node or the user terminal, waiting for the upstream node to retransmit the third upstream data packet, wherein the ACK repeated for M times corresponds to the first upstream data packet.

20. The server according to claim 19, wherein the program further includes instructions to:

after the receiver receives the third upstream data packet retransmitted by the upstream node, in response to the receiver receiving an ACK repeated for M times that is sent by the downstream node or the user terminal, send, to the downstream node or the user terminal, a sixth downstream data packet that is stored in a buffer and that matches the third upstream data packet.

* * * * *